United States Patent
Mitsuyoshi et al.

(10) Patent No.: US 7,314,414 B2
(45) Date of Patent: Jan. 1, 2008

(54) GAME DEVICE, STORING MEDIUM STORING GAME PROGRAM, AND GAME METHOD USING ULTRAVIOLET RAYS

(75) Inventors: Masaru Mitsuyoshi, Kyoto (JP); Takayuki Haga, Kyoto (JP)

(73) Assignee: Nintendo Co., Ltd., Kyoto-Shi (JP)

(*) Notice: Subject to any disclaimer, the term of this patent is extended or adjusted under 35 U.S.C. 154(b) by 883 days.

(21) Appl. No.: 10/784,206

(22) Filed: Feb. 24, 2004

(65) Prior Publication Data
US 2004/0171424 A1     Sep. 2, 2004

(30) Foreign Application Priority Data
Feb. 24, 2003    (JP) .............................. 2003-045423

(51) Int. Cl.
A63F 13/00 (2006.01)
(52) U.S. Cl. ............................ 463/43; 463/43; 463/44; 463/45

(58) Field of Classification Search ................ 463/43, 463/44, 45, 46, 47; 250/365, 372, 461.1, 250/504 R
See application file for complete search history.

(56) References Cited

FOREIGN PATENT DOCUMENTS
JP    2001-255205    9/2001

*Primary Examiner*—John Hotaling
*Assistant Examiner*—Reginald Renwick
(74) *Attorney, Agent, or Firm*—Nixon & Vanderhye P.C.

(57) ABSTRACT

A game apparatus includes a CPU, and the CPU executes a game program stored in a game cartridge. During a game, the CPU corrects an ultraviolet ray value detected by an ultraviolet ray sensor in such a manner as to render equal or approximate to a setting value of the ultraviolet ray value in the game, and uses a corrected ultraviolet ray value for the game. In addition, the CPU detects an accumulated value of the ultraviolet ray to which a player is exposed during the game, and when the accumulated value is equal to or larger than a predetermined amount (dangerous level), prohibits a game process.

26 Claims, 28 Drawing Sheets

FIG. 1
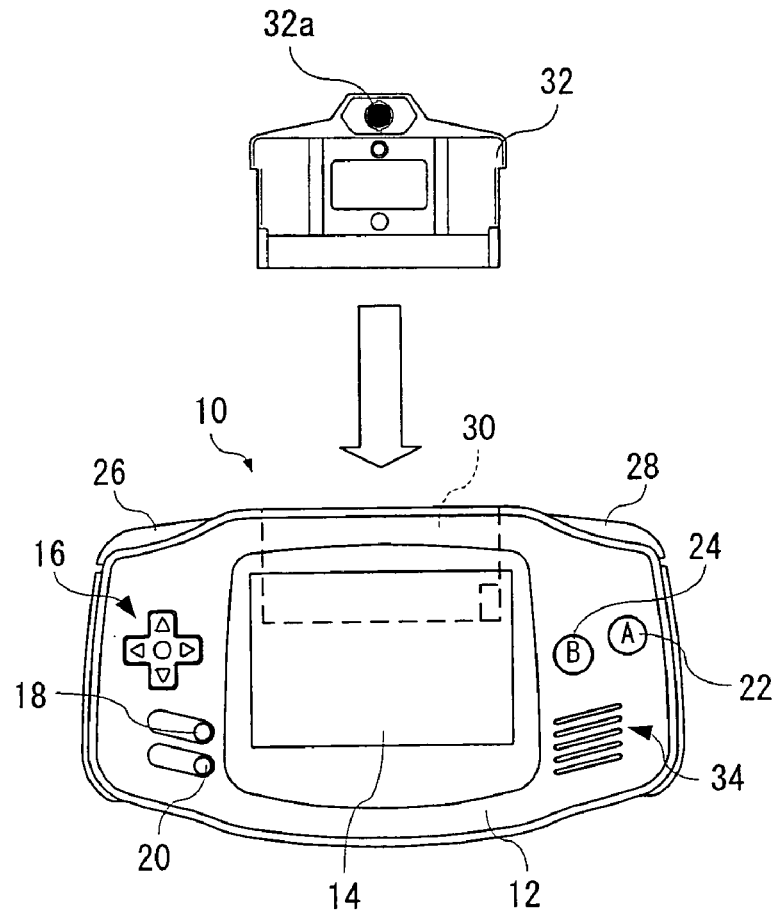
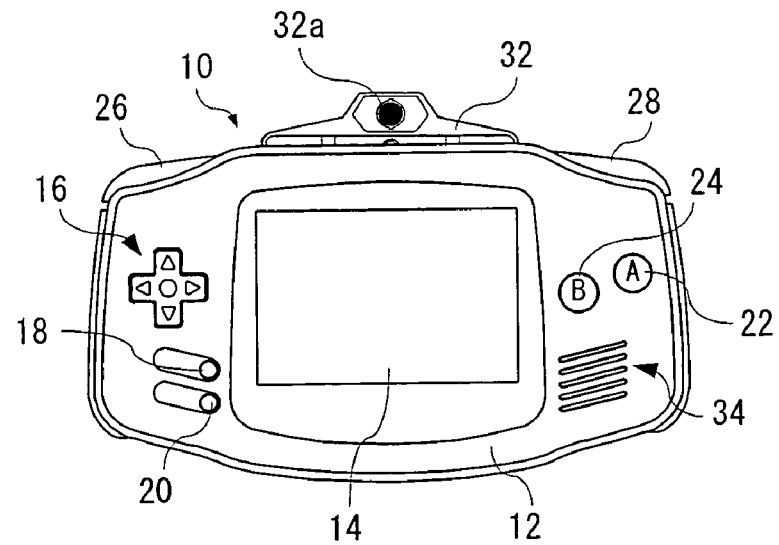

(A) GRAPH SHOWING CHANGE OF ULTRAVIOLET RAY VALUE OF JULY AND SETTING VALUE

☐ ULTRAVIOLET RAY VALUE GRAPH OF JULY
■ SETTING VALUE GRAPH (B)

| TIME | CORRECTING RATE OF JULY |
|---|---|
| 5 | 0.25 |
| 6 | 0.39 |
| 7 | 0.48 |
| 8 | 0.50 |
| 9 | 0.58 |
| 10 | 0.61 |
| 11 | 0.63 |
| 12 | 0.65 |
| 13 | 0.64 |
| 14 | 0.59 |
| 15 | 0.59 |
| 16 | 0.57 |
| 17 | 0.50 |
| 18 | 0.40 |
| 19 | 0.46 |

FIG. 10
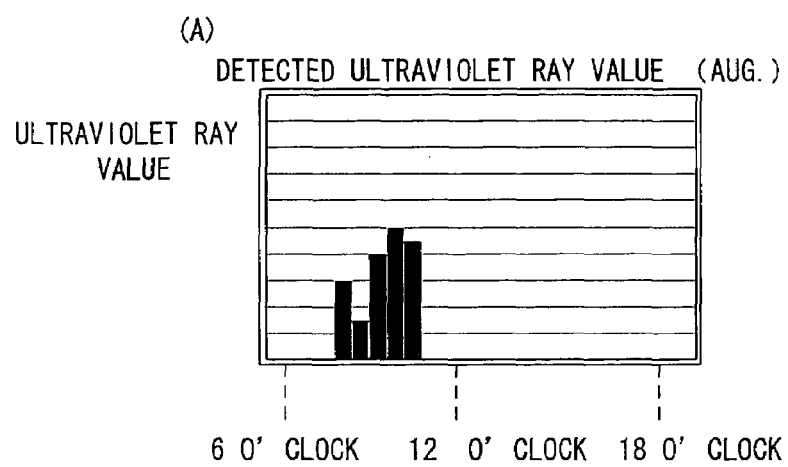
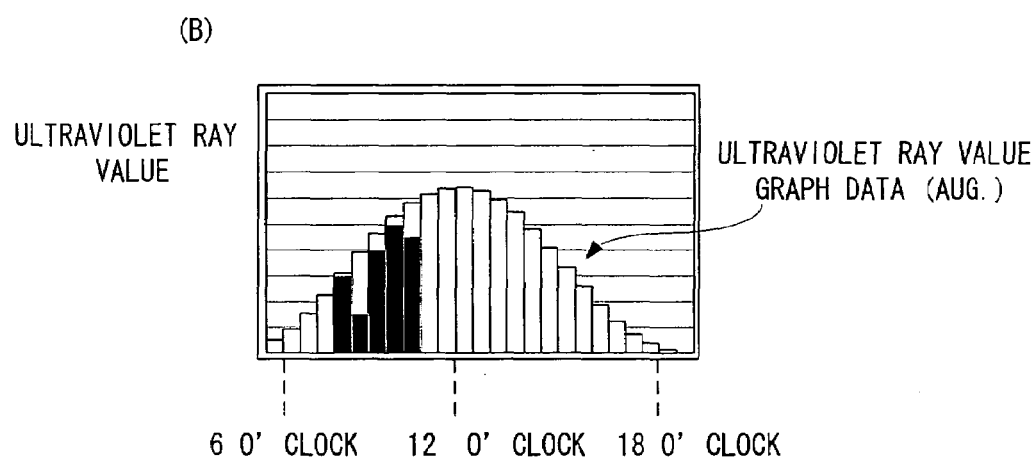

FIG. 14

RELATIVE TIME-PERIOD TABLE

|   | A | B | C | D | E | F | G | H | I | J | K | L |
|---|---|---|---|---|---|---|---|---|---|---|---|---|
| I |   |   |   |   |   |   |   |   |   |   |   |   |
| II |   |   |   |   |   |   |   |   |   |   |   |   |
| III |   |   |   |   |   |   |   |   |   |   |   |   |
| IV |   |   |   |   |   |   |   |   |   |   |   |   |
| V |   |   |   |   |   |   |   |   |   |   |   |   |
| VI |   |   |   |   |   |   |   |   |   |   |   |   |
| VII |   |   |   |   |   |   |   |   |   |   |   |   |
| VIII |   |   |   |   |   |   |   |   |   |   |   |   |
| IX |   |   |   |   |   |   |   |   |   |   |   |   |
| X |   |   |   |   |   |   |   |   |   |   |   |   |

(EXAMPLE OF DIVIDING TIME-PERIOD OF ONE DAY INTO 12 PORTIONS, AND RENDERING ONE WEEK 10 DAYS)

FIG. 15

MAXIMUM VALUE TABLE

|   | A | B | C | D | E | F | G | H | I | J | K | L |   |
|---|---|---|---|---|---|---|---|---|---|---|---|---|---|
| I | 190 |  |  |  |  |  |  |  |  | 100 | 150 | 170 | ⎫ |
| II |  |  |  |  |  |  |  |  |  |  |  | 100 |  |
| III | 180 |  | 50 |  |  |  |  |  |  |  | 100 |  | FIRST WEEK |
| IV |  | 100 |  |  |  |  |  |  |  |  |  | 190 |  |
| V |  |  |  |  |  |  |  |  | 50 | 110 | 130 | 50 |  |
| VI |  | 30 |  |  |  |  |  |  |  | 80 |  | 150 |  |
| VII |  | 20 |  |  |  |  |  |  |  |  |  |  |  |
| VIII | 130 | 80 |  |  |  |  |  |  |  |  | 90 |  |  |
| IX | 30 |  | 20 |  |  |  |  |  |  | 90 |  | 100 |  |
| X | 40 |  |  |  |  |  |  |  |  |  |  |  | ⎭ |
| I | 120 | 60 |  |  |  |  |  |  |  |  | 170 | 80 | ⎫ |
| II | 140 |  |  |  |  |  |  |  |  |  |  |  | SECODN WEEK |
| III |  |  |  |  |  |  |  |  |  |  |  |  |  |
| IV |  |  |  |  |  |  |  |  |  |  |  |  |  |
| V |  |  |  |  |  |  |  |  |  |  |  |  | ⎭ |
| ... |  |  |  |  |  |  |  |  |  |  |  |  |  |

(A) MAXIMUM VALUE TABLE

| | A | B | C | D | E | F | G | H | I | J | K | L |
|---|---|---|---|---|---|---|---|---|---|---|---|---|
| I | 120 | | | | | | | | | | | |
| II | 140 | 60 | | | | | | | | | 170 | 80 |
| III | | | | | | | | | | | | |
| IV | | | | | | | | | | | | |
| V | | 100 | | | | | | | 50 | 110 | 130 | 50 |
| VI | | | | | | | | | | 80 | | 150 |
| VII | 130 | 30 | | | | | | | | | | |
| VIII | 30 | 20 | | | | | | | | 90 | 90 | 100 |
| IX | 40 | 80 | 20 | | | | | | | | | |
| X | | | | | | | | | | | | |

(B)

| | A | B | C | D | E | F | G | H | I | J | K | L |
|---|---|---|---|---|---|---|---|---|---|---|---|---|
| MAXIMUM VALUE | 140 III | 100 VI | 20 X | | | | | | 50 V | 110 V | 170 II | 150 VI |
| SECOND | 130 VIII | 80 X | | | | | | | | 90 IX | 130 V | 100 VIII |

FIG. 18
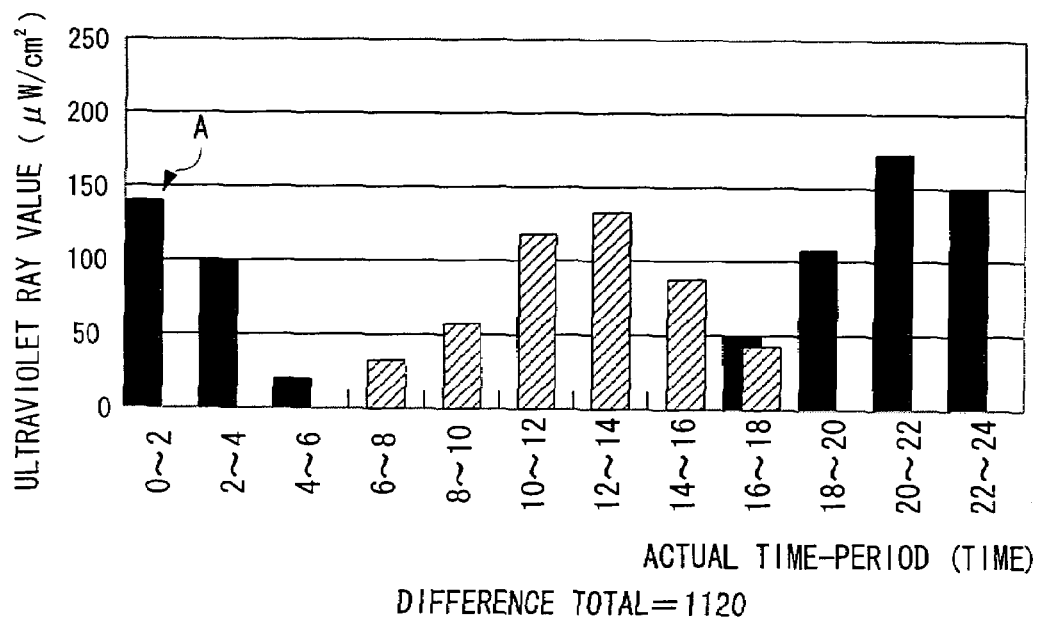
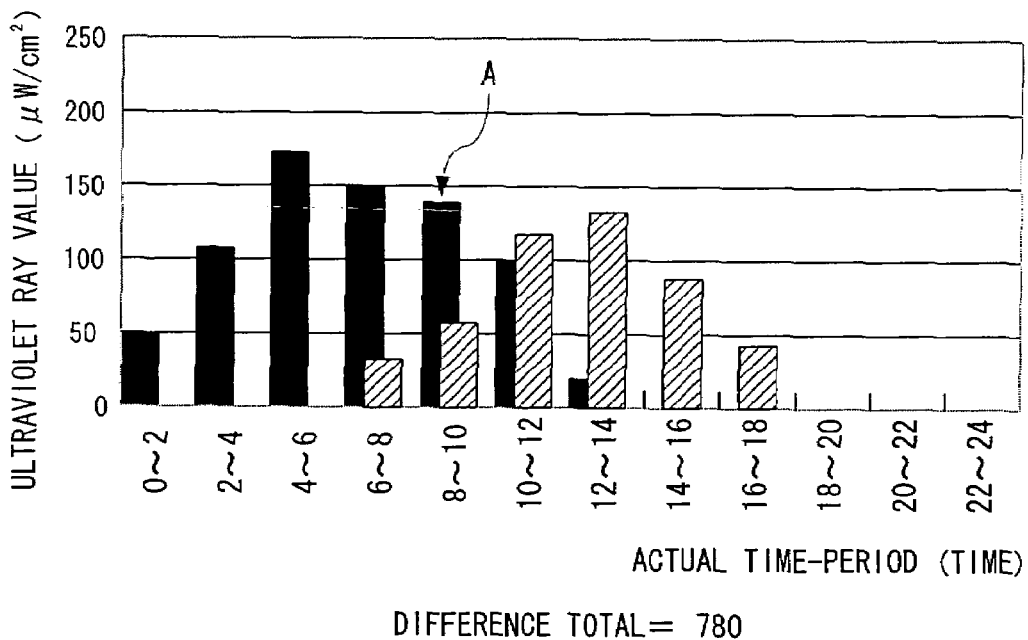

FIG. 19
(A) TIME A = 12 O' CLOCK - 14 O' CLOCK
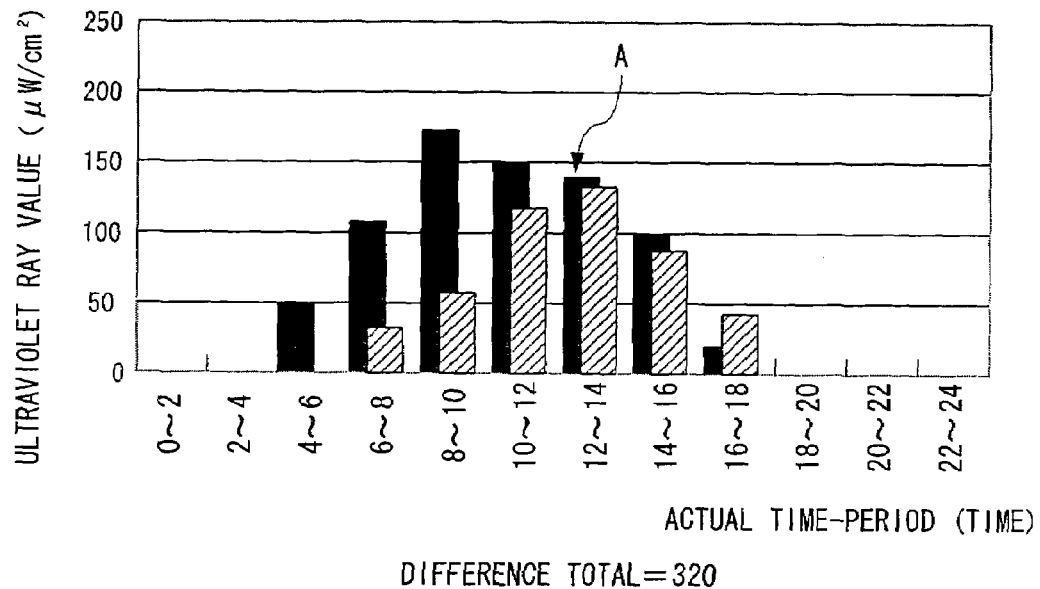
DIFFERENCE TOTAL = 320
(B) TIME A = 14 O' CLOCK - 16 O' CLOCK
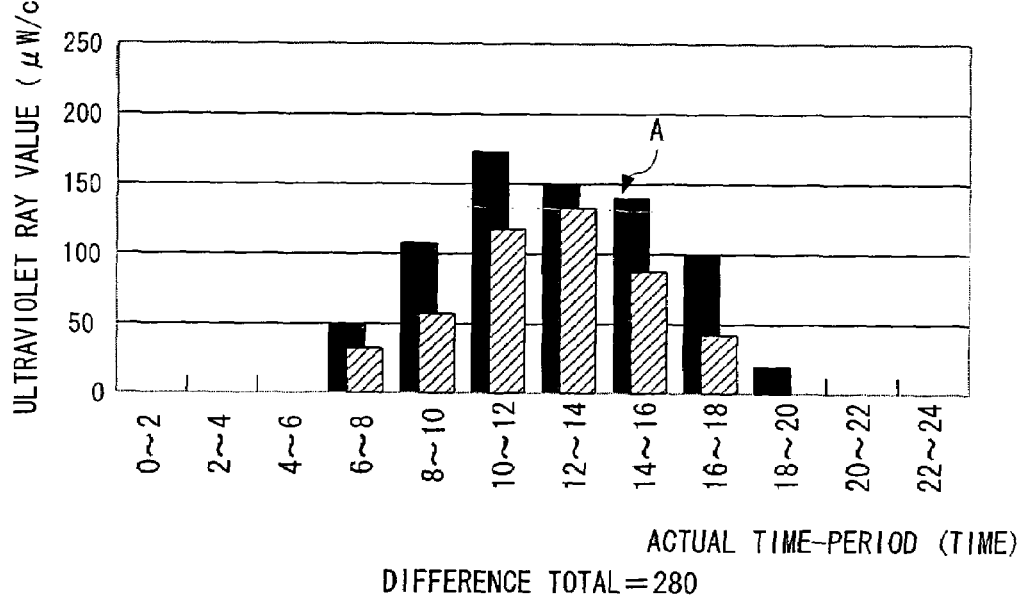
DIFFERENCE TOTAL = 280

FIG. 20
(A) TIME A = 16 O' CLOCK – 18 O' CLOCK
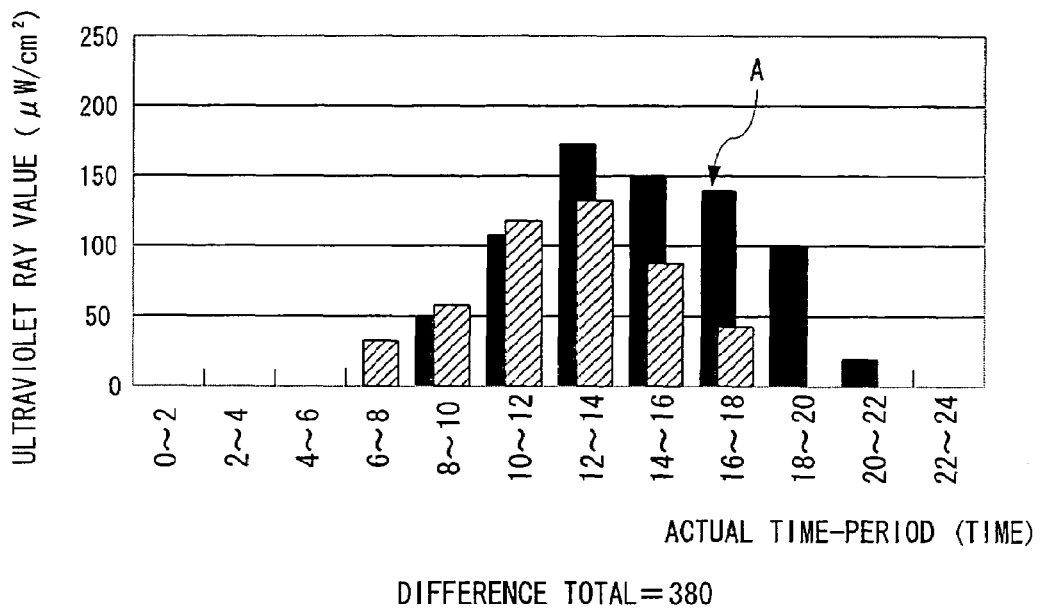
DIFFERENCE TOTAL = 380
(B) TIME A = 22 O' CLOCK – 24 O' CLOCK
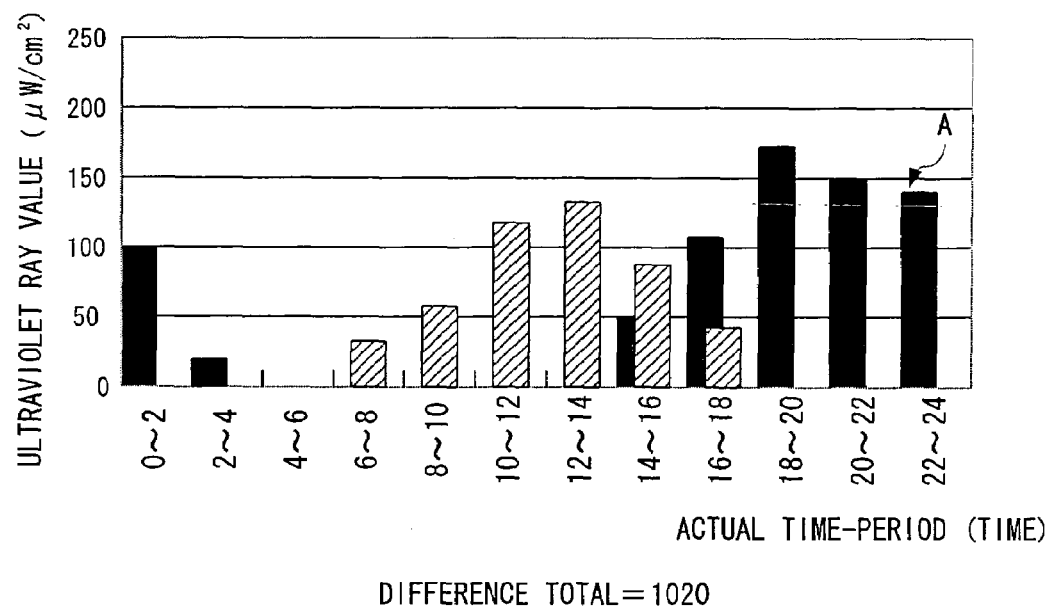
DIFFERENCE TOTAL = 1020

GAME DEVICE, STORING MEDIUM STORING GAME PROGRAM, AND GAME METHOD USING ULTRAVIOLET RAYS

FIELD

The illustrative embodiments relate to a game apparatus, a storing medium that stores a game program, and a game method. More specifically, the illustrative embodiments relate to a game apparatus, a storing medium that stores a game program, and a game method that use ultraviolet rays to affect a game.

BACKGROUND AND SUMMARY

When children play a video game on a television, they have little time to play outdoors, and therefore, the children have few opportunities to be exposed to sunlight. Thus, a negative influence on a children's growth (their bones become weaker, for example) as a result of playing a video game indoors is viewed as a problem. To solve this problem, a portable terminal is provided, in which sunlight is monitored, and the monitoring is reflected in a game.

One example of prior art is disclosed in Japanese Patent Laying-open No. 2001-255205 [G01J 1/42, A63F 13/00, G01J 1/02] published on Sep. 21, 2001. This ultraviolet ray monitoring apparatus is an apparatus related to an art in which, as a result of an ultra violet ray sensor detecting the intensity of ultraviolet rays in the sunlight, instantaneous or accumulative ultraviolet ray information is generated, and game content is changed (change in growth of a plant, for example) based on the generated ultraviolet ray information. Furthermore, if continuously used for a long period of time, the ultraviolet ray monitoring apparatus issues a warning that informs the player of excessive exposure to ultraviolet rays.

However, although the sunlight is good for heath, if excessively exposed to ultraviolet rays included in the sunlight, some players may develop a sunburn. The ultraviolet rays greatly differ in intensity depending on the season, as shown in FIG. 28, and although in summer, the children can be excessively exposed to ultraviolet rays after only a few hours, in the seasons (periods) other than summer, no, or effectively no, adverse effect is caused due to ultraviolet rays even if the player stays outdoors for the same amount of time.

In addition, as in the ultraviolet ray monitoring apparatus in the prior art, in the case where the game content changes based directly on the intensity and duration of the ultra violet rays, monitored by the ultra violet ray monitoring apparatus, a large difference is occurs depending on the season. Therefore it is not possible to experience the same aspect of the game in winter, when the ultraviolet ray value is low, as it is in summer, when the ultraviolet ray value is high. Thus, one problem is that game balance is collapsed.

Furthermore, when continuously used for a long period of time, only a warning of excessive exposure to ultraviolet rays is given. Therefore, the player can neglect the warning and continue the game. Thus another problem is that the warning does not effectively prevent an excessive exposure to ultraviolet rays.

The illustrative embodiments provide a novel game apparatus, a storing medium that stores a game program, and a game method.

The illustrative embodiments also provide a game apparatus, a storing medium that stores a game program, and a game method capable of giving a consistent aspect of a game without being affected by a variance dependant on a location of use or a period when using ultraviolet rays to affect the game.

The illustrative embodiments further provide a game apparatus, a storing medium that stores a game program, and a game method capable of effectively preventing excessive exposure to ultraviolet rays.

A game device according to the illustrative embodiments is a game apparatus that uses ultraviolet rays to affect a game, and comprises: a game program storing means; an operating means; an ultraviolet ray value detecting means; a correcting-data storing means; an ultraviolet ray value correcting means; and a game process means. The game program storing means stores a game program. The operating means inputs operating information by a player. The ultraviolet ray value detecting means detects an ultraviolet ray value. The correcting-data storing means stores correcting data for correcting the ultraviolet ray value. The ultraviolet ray value correcting means corrects the ultraviolet ray value detected by the ultraviolet ray value detecting means based on the correcting data. The game process means executes the game, based on the game program stored in the game program storing means and the operating information input by the operating means, and uses the ultraviolet ray value, corrected by the ultraviolet ray value correcting means, to alter the game content.

More specifically, the game apparatus (10 reference numeral used for illustrative purposes only) uses ultraviolet rays to affect a game. The ultraviolet ray value detecting means (32*a*) detects the intensity of the ultraviolet rays, that is, the ultraviolet ray value, and the ultraviolet ray value correcting means (40, S9) uses the correcting data (606*a*, 606*b*) stored in the correcting-data storing means (60) to correct the detected ultraviolet ray value to the setting value, for example. The game process means (40) executes the game based on the game program (602) stored in the game program storing means and the operating information of the player input by the operating means (16, 18, 20, 22, 24, 26, 28), and uses the corrected ultraviolet ray value to affect the game.

According to the illustrative embodiments, the corrected ultraviolet ray value is used to affect the game so that it is possible to consistently apply an aspect of the game without being affected due to a variance of the ultraviolet ray value.

In one illustrative embodiment, the correcting data includes a correcting value associated with a month/date, and a time, and comprises a first time-measuring means for measuring the month/date and the time. The ultraviolet ray value correcting means corrects the ultraviolet ray value detected by the ultraviolet ray value detecting means based on the correcting data corresponding to the month/date and the time measured by the first time-measuring means. More specifically, the correcting data (606) includes the correcting value associated with the month/date, and the time. The first time-measuring means (66) measures the month/date, and the time so that using the correcting value corresponding to the month/date and the time when the ultraviolet ray value is detected, it is possible to correct the ultraviolet ray value. That is, it is possible to easily correct the ultraviolet ray value based on the measured month/date and the time.

In another illustrative embodiment, the correcting-data storing means stores the data of two or more graphs with a changing ultraviolet ray value that varies with time. The game apparatus further comprises a determining means for determining the data of a single, corrected graph, by comparing the ultraviolet ray value detected by the ultraviolet ray value detecting means with the ultraviolet ray value of the graph data. Based on the correcting data corresponding to the data of the corrected graph, determined by the determining means, the ultraviolet ray value correcting means corrects the ultraviolet ray value detected by the ultraviolet ray value detecting means. More specifically, the correcting data storing means (606) stores the data of two or more graphs with a changing ultraviolet ray value that varies with time, so that by comparing the detected ultraviolet ray value with the graph data, it is possible to determine the data of a single, corrected graph (606a). Therefore, it is possible to use the correcting data (606b) corresponding to the corrected graph data (606a). That is, without needing a clock function, it is possible to exactly correct the ultraviolet ray value. In addition, it is possible to make an exact correction without being affected by a deviance of the clock as a result of the clock function being used, a time difference as a result of a longitudinal difference, a change of the ultraviolet ray value as a result of a latitudinal difference, or a yearly change of the ultraviolet ray value, etc.

In a certain feature of an illustrative embodiment, a game apparatus further comprises a difference detecting means for detecting a difference between the ultraviolet ray value detected by the ultraviolet ray value detecting means and the ultraviolet ray value of the graph data. The determining means determines the graph data that renders the difference detected by the difference detecting means to a minimum. More specifically, the difference detecting means (40, S63, S103) detects the difference between the ultraviolet ray value detected by the ultraviolet ray value detecting means (32a) and the ultraviolet ray value of the graph data (606a). The determining means (40, S65, S117) determines the graph data (606a) that renders the difference to a minimum. That is, the graph data (606a) showing the most approximate change in time is determined, and the correcting data (606b) corresponding thereto is used so that it is possible to appropriately correct the detected ultraviolet ray value.

In another feature of an illustrative embodiment, a game apparatus further comprises an ultraviolet ray value recording means for recording, according to a relative time-period, the ultraviolet ray value detected by the ultraviolet ray value detecting means, and a setting means for setting a relative time, at which the highest ultraviolet ray value is detected, to an absolute time, at which the highest ultraviolet ray value occurs in the ultraviolet ray values of the graph data. The difference detecting means detects a difference at the time corresponding to the relative time set, by the setting means, to the absolute time. More specifically, the ultraviolet ray value storing means (40, S149) stores, according to the relative time-period, the ultraviolet ray value detected by the ultraviolet ray value detecting means (32a). The setting means (40, S95) sets the relative time-period, corresponding to the maximum detected ultraviolet ray value, to the absolute time-period (actual time-period) corresponding to the maximum ultraviolet ray value out of the ultraviolet ray values of the graph data (606a). That is, a deviance of a time-period axis is temporarily corrected. Thus, the variance of the ultraviolet ray value is detected, in a state that the deviance is corrected. Although it is possible to correct the deviance of the time-period axis by each predetermined amount, and detect each difference, it also is possible to reduce a detecting (calculating) process of the difference, by moving the time-period axis to a vicinity where the minimum difference is expected to occur.

In another feature of an illustrative embodiment, the setting means includes an adjusting means for adjusting data so that all the ultraviolet ray values detected by the ultraviolet ray value detecting means are contained between a sunrise and a sunset in the graph data. More specifically, the adjusting means (40, S97) adjusts data so that the detected ultraviolet ray value is contained between the sunrise and the sunset, not only rendering the difference to a minimum, but also making it possible to determine the graph data (606a) showing the same change in time. Thereby, it is possible to appropriately correct the detected ultraviolet ray value.

In another feature of the illustrative embodiments, a game apparatus further comprises a second time-measuring means for measuring a time. The determining means compares the ultraviolet ray value detected by the ultraviolet ray value detecting means with the ultraviolet ray value of the graph data corresponding to the time measured by the second time-measuring means so as to determine the data for a single graph. More specifically, the second time measuring-means (66) measures the time. The determining means (40, S65) compares the detected ultraviolet ray value with the ultraviolet ray value of the graph corresponding to the measured time so as to specify data for a single graph. Even if the month/date is not known, it is possible to specify the graph data based only on the time.

In another illustrative embodiment, a game apparatus further comprises a third time-measuring means for measuring a detected time-period over which the ultraviolet ray value is detected by the ultraviolet ray value detecting means, an accumulated-value calculating means for calculating an accumulated value of the ultraviolet ray based on the ultraviolet ray value detected by the ultraviolet ray value detecting means and the detected time-period measured by the third time-measuring means, an accumulated-value determining means for determining whether or not the accumulated value calculated by the accumulated-value calculating means is equal to or larger than a predetermined value, and a game-process prohibiting means for prohibiting a game process when determined by the accumulated-value determining means that the accumulated value is equal to or larger than the predetermined value. More specifically, the third time-measuring means (66) measures a time-period over which the ultraviolet ray value is detected, and an accumulated-value calculating means (40, S41) calculates an accumulated value of the ultraviolet ray based on the ultraviolet ray value and the detected time-period. The accumulated-value determining means (40, S165, S185) determines whether or not the accumulated value is equal to or greater than a predetermined value (dangerous level, for example). The game-process prohibiting means (40, S169, S189) prohibits a game process when the accumulated value is equal to or greater than the dangerous level. In addition to performing a warning display, the game process is prohibited so that it is possible to effectively prevent excessive exposure to ultraviolet rays.

In another illustrative embodiment, a game apparatus further comprises a sound controlling means for changing a sound in correspondence with the ultraviolet ray value detected by the ultraviolet ray value detecting means, and a sound outputting means for outputting the sound changed by the sound controlling means. More specifically, the sound controlling means (40, S47) changes the sound in correspondence with the detected ultraviolet ray value, and the sound outputting means (34, 40, S47) outputs the changed sound. A player can easily tell by the sound that the ultraviolet ray is being detected, and the player can also determine other things, such as the intensity of the ultraviolet rays, by a change of the sound, for example.

In a certain illustrative embodiment, the sound controlling means changes at least one of: a kind, a stress, a pitch, a tempo, or a melody of the sound. More specifically, the sound controlling means (40, S47) changes at least one of: the kind, the stress, the pitch, the tempo, or the melody of the sound so that, besides informing the player that the ultraviolet rays are detected, it is possible to improve the game experience.

Another game apparatus according to an illustrative embodiment, comprises a game program storing means, an operating means, an ultraviolet ray value detecting means, a game process means, a first time-measuring means, an accumulated-value calculating means, an accumulated-value determining means, and a game-process prohibiting means. The game program storing means stores the game program. The operating means inputs the operating information input by a player. The ultraviolet ray value detecting means detects an ultraviolet ray value. The game process means executes a game based on the game program stored in the game program storing means and the operating information input by the operating means, and uses ultraviolet ray value, detected by the ultraviolet ray value detecting means, to affect the game. The first time-measuring means measures a time-period over which the ultraviolet ray value is detected by the ultraviolet ray value detecting means. The accumulated-value calculating means calculates an accumulated value of the ultraviolet ray based on the ultraviolet ray value detected by the ultraviolet ray value detecting means and the time-period measured by the first time-measuring means. The accumulated-value determining means determines whether or not the accumulated value calculated by the accumulated-value calculating means is equal to or greater than a predetermined value. The game-process prohibiting means prohibits the game process means when the accumulated-value determining means determines that the accumulated value is equal to or greater than the predetermined value.

More specifically, in the game apparatus (10), the game process means (40) executes a game based on the game program (602) stored in the game program storing means (60) and the operating information input by the operating means (16, 18, 20, 22, 24, 26, 28), and uses the ultraviolet ray value, detected by the ultraviolet ray value detecting means, to affect a game. The first time-measuring means (66) measures a time-period over which the ultraviolet ray value is detected, and the accumulated-value calculating means (40, S41) calculates an accumulated value of the ultraviolet ray based on the detected ultraviolet ray value and the measured time-period. The accumulated-value determining means determines whether or not the accumulated value is equal to or greater than a predetermined value (dangerous level), and the game-process prohibiting means (40, S169, S189) prohibits a game process by the game process means (40) when the accumulated value is equal to or greater than the dangerous level. The game play is forcedly prohibited so that it is possible to effectively prevent excessive exposure to ultraviolet rays as a result of the player playing the game outside for too long a time.

In a certain feature of an illustrative embodiment, a game apparatus further comprises a warning means for issuing a warning that the game that uses ultraviolet rays cannot be played, if it is determined by the accumulated-value determining means that the accumulated value is equal to or greater than the predetermined value. More specifically, when the accumulated value is equal to or greater than the dangerous level, the warning means (14, 40, S171) warns that it is not possible to play the game that uses ultraviolet rays, so that the player knows he or she has been excessively exposed to ultraviolet rays, and so the player knows that the game cannot be played. That is, it is possible to effectively prevent excessive exposure to ultraviolet rays.

In a certain illustrative embodiment, the game-process prohibiting means prohibits the ultraviolet ray value detected by the ultraviolet ray value detecting means from being used for the game. More specifically, the game-process prohibiting means (40, S169) prohibits the ultraviolet ray value from being used to affect the game. Thus, a player is prohibited from playing the game that uses the ultraviolet ray when the maximum exposure has been reached, but it is possible for the player to select a game other than the game that uses the ultraviolet ray.

In another illustrative embodiment, the game-process prohibiting means forcedly ends the game process of the game process means, and the game apparatus further comprises a back-up means for backing-up game data immediately before the game process is forcedly ended by the game-process prohibiting means. More specifically, the game-process prohibiting means (40, S189) forcedly ends the game process. The back-up means (40, S167, S187) backs-up the game data immediately before the game process is forcedly ended so that it is possible to save the game data that has been updated until this time. Therefore, the player is capable of resuming the game from a state immediately before the game was forcedly ended.

In another feature of an illustrative embodiment, a game apparatus further comprises a second time-measuring means for measuring an elapsed time-period from a time that the game process is prohibited by the game-process prohibiting means, an elapsed time-period determining means for determining whether or not the elapsed time-period measured by the second time-measuring means exceeds a predetermined time period, and a game-process-prohibition canceling means for canceling a game process prohibition when the elapsed time-period exceeds the predetermined time period. While the elapsed time-period does not exceed the predetermined time period, the game-process prohibiting means continues the game process prohibition. More specifically, the second time-measuring means (66) measures the elapsed time-period from a time that the game process is prohibited, and the elapsed time-period determining means (40, S173, S193) determines whether or not the elapsed time-period exceeds the predetermined time period. The game-process-prohibition canceling means (40, S175, S195) cancels the game process prohibition when the elapsed time-period exceeds the predetermined time period. On the other hand, when the elapsed time-period does not exceed the predetermined time period, the game-process prohibiting means (40, S167, S189) continues the game process prohibition. That is, if the predetermined time period is elapsed, the player once again can play the game that uses ultraviolet rays. However, until the predetermined time period has elapsed, the game prohibition state remains.

In another illustrative embodiment, a game apparatus further comprises a game data storing means including at least a first back-up area and a second back-up area, and a selecting means for selecting either game data stored in the first back-up area or the game data stored in the second back-up area when starting the game. The back-up means writes the game data into the first back-up area at a certain time, when responding to an instruction of a player, and writes the game data into the second back-up area at a certain time, immediately before the game process is prohibited by the game-process prohibiting means. More specifically, the game data storing means (62) includes at least the first back-up area (622a) and the second back-up area (622b). The back-up means (40, S17, S167, S189) writes the game data into the first back-up area at a certain time, when responding to an instruction of a player, or writes the game data into the second back-up area at a certain time, immediately before the game process is prohibited by the game-process prohibiting means (40, S169, S189). That is, the game data is selectively written into the back-up area. Therefore, the selecting means (40, S27) is capable of selecting either the game data stored in the first back-up area (622a) or the game data stored in the second back-up area (622b) when starting the game. That is, when resuming the game from a portion that the player last played, it is possible to read out the game data saved by a player's own command or the game data saved immediately before the game process was prohibited.

In another illustrative embodiment, a game apparatus further comprises a sound controlling means for changing a sound in correspondence with the ultraviolet ray value detected by the ultraviolet ray value detecting means, and a sound outputting means for outputting the sound changed by the sound controlling means. More specifically, the sound controlling means (40, S47) changes the sound in correspondence with the detected ultraviolet ray value, and the sound outputting means (34, 40, S47) outputs the changed sound. Based on the sound, the player easily knows that the ultraviolet ray is being detected, and knows the intensity of the ultraviolet rays, etc., by the changing of the sound.

In a certain feature of an illustrative embodiment, the sound controlling means changes at least one of: a kind, a stress, a pitch, a tempo, or a melody of the sound. More specifically, the sound controlling means (40, S47) changes at least one of: the kind, the stress, the pitch, the tempo, the melody of the sound so that besides informing that the ultraviolet ray is detected, it is possible to improve the game experience.

A storing means stores a game program according to the illustrative embodiments, and the storing means stores a game program of a game apparatus that is provided with an operating means for inputting operating information input by a player, facilitates a game by generating and displaying a game image on a displaying means corresponding to the operating information, and uses ultraviolet rays to affect the game. The game apparatus is further provided with a correcting-data storing means for storing correcting data for correcting an ultraviolet ray value, and the game program allows a processor of the game apparatus to execute the following steps: an ultraviolet ray value detecting step for detecting the ultraviolet ray value; an ultraviolet ray value correcting step for correcting, based on the correcting data, the ultraviolet ray value detected by the ultraviolet ray value detecting step; and a game process step for using the ultraviolet ray value, corrected by the ultraviolet ray value correcting step, to affect the game.

In this storing means that stores the game program, it is also possible to consistently apply an entertaining aspect of the game, similar to the above-described game apparatus.

Another illustrative embodiment provides a storing means that stores a game program according to the illustrative embodiments. The storing means stores a game program of a game apparatus that is provided with an operating means for inputting operating information input by a player, facilitates a game by generating and displaying a game image on a displaying means corresponding to the operating information, and uses an ultraviolet ray to affect the game. The game program allows a processor of the game apparatus to execute following steps: an ultraviolet ray value detecting step for detecting the ultraviolet ray value: a game process step for using the ultraviolet ray value, detected by the ultraviolet ray value detecting step, to affect the game; a time-measuring step for measuring a detected time-period of the ultraviolet ray value detected by the ultraviolet ray value detecting step; an accumulated value calculating step for calculating an accumulated value of the ultraviolet ray based on the ultraviolet ray value detected by the ultraviolet ray value detecting step and the detected time-period measured by the time-measuring step; an accumulated-value determining step for determining whether or not the accumulated value calculated by the accumulated value calculating step is equal to or greater than a predetermined value; and a game-process prohibiting step for prohibiting a game process when the accumulated-value determining step determines that the accumulated value is equal to or greater than the predetermined value.

In another storing medium that stores this game program, it is possible to effectively prevent an excessive exposure to ultraviolet ray, similar to the above-described invention of another game apparatus.

In a game method according to an illustrative embodiment, a game apparatus is provided with a game program storing means for storing a game program and an operating means for inputting operating information input by a player. The game method of the game apparatus that uses ultraviolet rays to affect a game, and the game apparatus are further provided with a correcting-data storing means that stores correcting data for correcting an ultraviolet ray value. The game method includes following steps: (a) detecting the ultraviolet ray value, (b) correcting the ultraviolet ray value detected by the step (a) based on the correcting data, and (c) executing the game based on the game program stored in the game program storing means and the operating information input by the operating means, and using the ultraviolet ray value corrected by the step (b) to affect the game.

In this game method, it is possible to apply a constant interesting aspect of the game, similar to the above-described game apparatus.

In another game method according to an illustrative embodiment, a game apparatus is provided with a game program storing means that stores a game program and an operating means for inputting operating information input by a player, and uses ultraviolet rays to affect a game. The game method comprises following steps of: (a) detecting the ultraviolet ray value, (b) executing the game based on the game program stored in the game program storing means and the operating information input by the operating means, and using the ultraviolet ray value detected by the step (a) to affect the game, (c) measuring a time-period of the ultraviolet ray value by the step (a), (d) calculating an accumulated value of the ultraviolet ray based on the ultraviolet ray value detected in the step (a) and the detected time-period measured in the step (c), (e) determining whether or not the accumulated value calculated by the step (d) is equal to or greater than a predetermined value, and (f) prohibiting a game process by the step (b) when determined in the step (e) that the accumulated value is equal to or greater than the predetermined value.

In the illustrative embodiment of another game method, it is possible to effectively prevent excessive exposure to ultraviolet rays, similar to the above-described invention of another game apparatus.

The above described aspects of the illustrative embodiments will become more apparent from the following detailed description of the illustrative embodiments when taken in conjunction with the accompanying drawings.

BRIEF DESCRIPTION OF THE DRAWINGS

FIG. 1 is an illustrative view showing one example of a game apparatus of the illustrative embodiments;

FIG. 5 (B) is an illustrative view showing a table of corrected ratio data of the ultraviolet ray values in a case of FIG. 5 (A);

FIG. 10 (A) is a graph showing one example of a change in time of a detected ultraviolet ray value;

FIG. 10 (B) is a graph shown by superimposing the graph shown in FIG. 10 (A) and the graph based on the ultraviolet ray graph data;

FIG. 12 (B) is a graph based on ultraviolet ray graph data detected in advance;

FIG. 12 (C) a graph shown by superimposing the graph in FIG. 12 (A) and the graph in FIG. 12 (B);

FIG. 14 is an illustrative view showing one example of a relative time-period table;

FIG. 15 is an illustrative view showing one example of a maximum value table;

FIG. 16 (B) is an illustrative view showing the other example of the maximum value table;

FIG. 17 (B) is a graph of the ultraviolet ray value based on the ultraviolet ray graph data shown in FIG. 3;

FIG. 18 (A) is a graph shown by superimposing the graph A and the graph B in a case of setting a relative time-period A o'clock to actual time-periods 0-2 o'clock;

FIG. 18 (B) is a graph shown by superimposing the graph A and the graph B in a case of setting the relative time-period A o'clock to actual time-periods 8-10 o'clock;

FIG. 19 (A) is a graph shown by superimposing the graph A and the graph B in a case of setting the relative time-period A o'clock to actual time-periods 12-14 o'clock;

FIG. 19 (B) is a graph shown by superimposing the graph A and the graph B in a case of setting the relative time-period A o'clock to actual time-periods 14-16 o'clock;

FIG. 20 (A) is a graph shown by superimposing the graph A and the graph B in a case of setting the relative time-period A o'clock to actual time-periods 16-18 o'clock;

FIG. 20 (B) is a graph shown by superimposing the graph A and the graph B in a case of setting the relative time-period A o'clock to actual time-periods 22-24 o'clock;

FIG. 21 (B) is a graph shown by superimposing the graph A in a case of setting the relative time-period A o'clock to actual time-periods 14-16 o'clock, and a graph based on the ultraviolet ray graph data in a period that the ultraviolet ray value is relatively strong;

FIG. 21 (C) is a graph shown by superimposing the graph A in a case of setting the relative time-period A o'clock to actual time-periods 14-16 o'clock, and a graph based on the ultraviolet ray graph data in a period that the ultraviolet ray value is strong;

DETAILED DESCRIPTION OF THE ILLUSTRATIVE EMBODIMENTS

Figure 2:
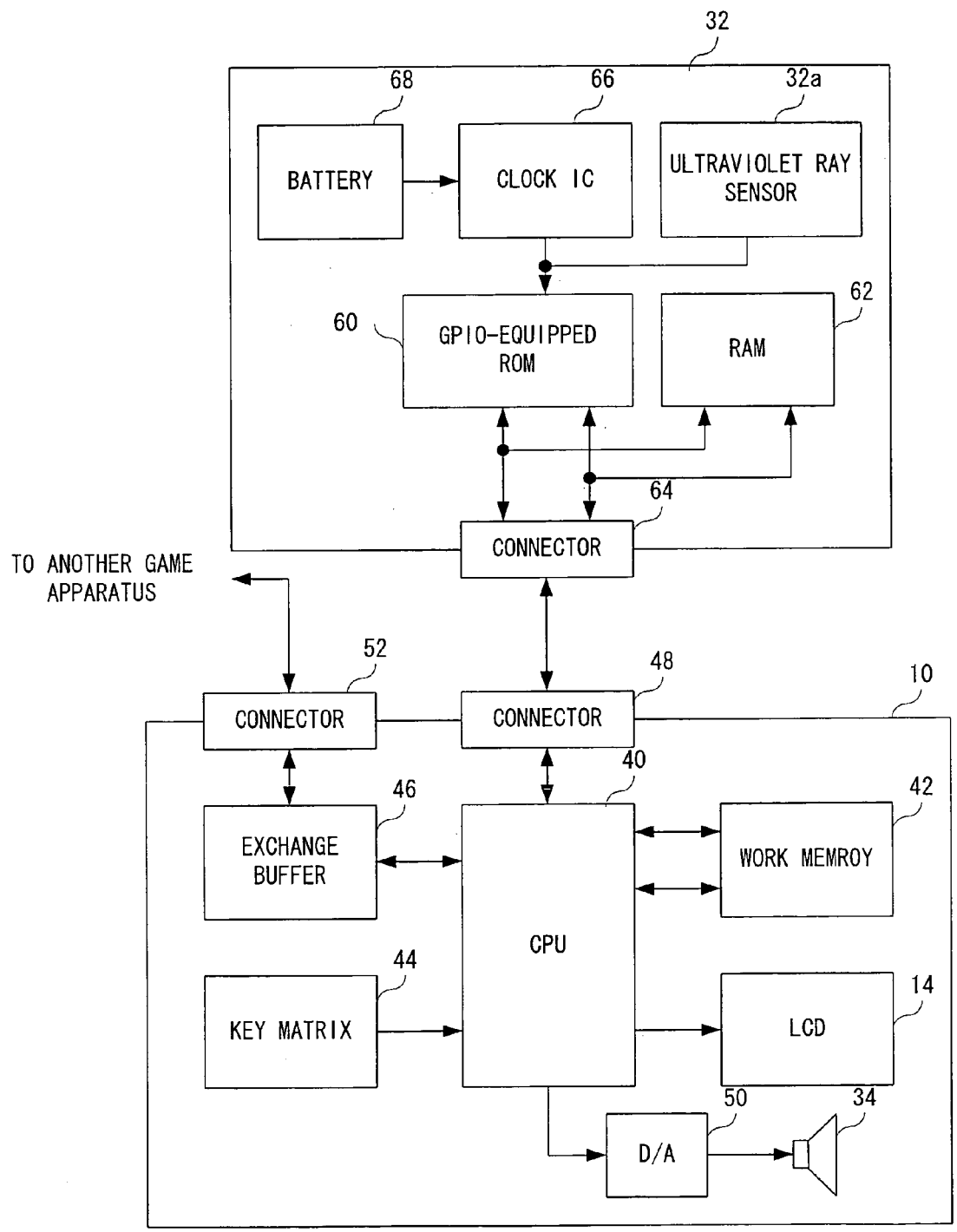
FIG. 2 is a block diagram showing electric structure of a video game apparatus shown in the FIG. 1 embodiment.

Referring to FIG. 1 (A), a game apparatus 10 of this embodiment is a hand-held game apparatus (product name: (Game Boy Advance)) manufactured and marketed by the applicant of the illustrative embodiments, for example, and includes a case 12. On a surface of the case 12, a liquid crystal display (hereinafter referred to as an "LCD") 14 is provided at an approximately center thereof. In this LCD 14, a game space and a game character existing within the game space are displayed, and a message is displayed as required. In addition, on the surface of the case 12, operating buttons 16, 18, 20, 22, 24, 26, and 28 are provided. The operating buttons 16, 18, and 20 are arranged at the left of the LCD 14, and the operating buttons 22 and 24 are arranged at the right of the LCD 14. Furthermore, at an edge surface (ceiling surface) on an upper side (above the LCD) of the case 12, the operating buttons 26 and 28 are arranged.

The operating button 16 is a cross button that functions as a digital joystick, and by operating one of four depressing portions, a player is capable of instructing a moving direction of the game character displayed on the LCD 14, moving a cursor, and so forth. The operating button 18 is a start button constructed of a push button, and is used for instructing the game device to start a game, and so forth. The operating button 20 is a select button constructed of the push button, and is used for selecting a game mode, and so forth.

The operating button 22 is an A button constructed of the push button, and is capable of allowing the game character displayed on the LCD 14 to perform arbitrary actions such as strike, throw, capture, ride, jump, and so forth. The operating button 24 is a B button constructed of the push button, and is used for changing the game mode selected by a select button 20, canceling the action determined by the A button, and so forth. The operating button 26 is a left-depressing button (L button) constructed of the push button, and the operating button 28 is a right-depressing button (R button) constructed of the push button. The operating button 26 and the operating button 28 are capable of performing a similar operation to the A button 22 and the B button 24, and performing a supporting operation of the A button 22 and the B button 24.

Furthermore, at an upper portion of a rear surface of the case 12, an inserting slot 30 is formed. Into this inserting slot 30, a game cartridge 32 is inserted. Although not illustrated, at either a far portion of the inserting slot 30, or an edge portion of an inserting direction of the game cartridge 32, connectors are provide, and therefore, as FIG. 1 (B) shows, when the game cartridge 32 is inserted into the inserting slot 30, the two connectors are connected with each other. Thus, a CPU 40 (see FIG. 2) of the game apparatus 10 accesses the game cartridge 32. In addition, in this game cartridge 32, an ultraviolet ray sensor 32a for detecting an ultraviolet ray included in sunlight (natural light) is provided.

Furthermore, on the surface of the case 12 and below the A button 22 and the button 24, a speaker 34 for outputting a BGM, a sound effect, or a sound (or voices) or a mimicking sound (or voices) of the game character during the game is provided.

Although not illustrated in FIG. 1 (A) and FIG. 1 (B), on a ceiling surface side of the case 12, an external extension connector 52 (see FIG. 2), described later, is further provided, and on a rear surface side of the case 12, a battery containing box is provided. In addition, on a bottom surface side of the case 12, a power switch, a sound volume switch, an earphone jack, etc., are provided.

Electric structure of the game apparatus 10 is shown as in FIG. 2. Referring to this FIG. 2, in the game apparatus 10, the CPU 40 is provided as described above. This CPU 40 is also called as a computer, a processor, etc., and is responsible for entirely controlling the game apparatus 10. The CPU 40 is connected to a work memory 42, the LCD 14, a key matrix 44, an exchanging buffer 46, the connector 48, and a D/A converter 50 via an internal bus (hereinafter briefly referred to as a "bus").

The work memory 42 is used as a work area or a buffer area of the CPU 40. To the key matrix 44, the cross button 16, the start button 18, the select button 20, the A button 22, the B button 24, the L button 26, the R button 28, etc., shown in FIG. 1 (A) and FIG. 1 (B) are connected, and when these buttons are operated, the key matrix 44 generates an operating signal corresponding to the operated button and inputs the operating signal into the CPU 40.

In the LCD 14, a display signal is applied from the CPU 40, and a game image is displayed. Although not illustrated, a VRAM and an LCD controller are connected to the CPU 40, for example, and under the instruction of the CPU 40, game image (image in the game space) data, character image data, or message display image data read out from a ROM 60 described later are rendered in the VRAM. In addition, the LCD controller reads out image data rendered in the VRAM according to an instruction of the CPU 40, and displays the game space, the character, the message, etc., in the LCD 14.

The exchanging buffer 46 is a buffer for temporarily accumulating data exchanged between another game apparatus when interactively playing a multi-person game, and is connected to another game apparatus via the connector 52 and a communication cable (not shown) as the external extension connector, for example.

The D/A converter 50 converts signal data of the sound (sound data) into an analog sound (voices) necessary for the game, such as the BGM, the sound effect, or the sound (or voices) or the mimicking sound (or voices) of the game character applied by the CPU 40, and outputs the signal via the speaker 34.

In addition, in the game cartridge 32, a GPIO (General Purpose Input/Output)-equipped ROM (hereinafter briefly referred to as a "ROM") 60, and an RAM 62 such as a non-volatile memory are provided, the ROM 60 and the RAM 62 are connected with each other via a bus, and connected to the connector 64. As described above, when the game cartridge 32 is attached to the game apparatus 10, the connector 48 and the connector 64 are connected, and therefore, the CPU 40 is electrically connected to the ROM 60 and the RAM 62. Furthermore, to the ROM 60, an ultraviolet ray sensor 32a and a clock IC 66 are provided, and a battery 68 is connected to the clock IC 66.

It is noted that in this embodiment, as the non-volatile memory, a flash memory, a ferroelectric memory (FeRAM), an EEPROM, etc., can be used.

The ROM 60 is provided with the predetermined number of general-purpose ports, and in response to a request from the CPU 40, applies to the CPU 40 data of an ultraviolet ray value detected in the ultraviolet ray sensor 32a and data of a time period (and month/date) measured by the clock IC 66.

Figure 3:
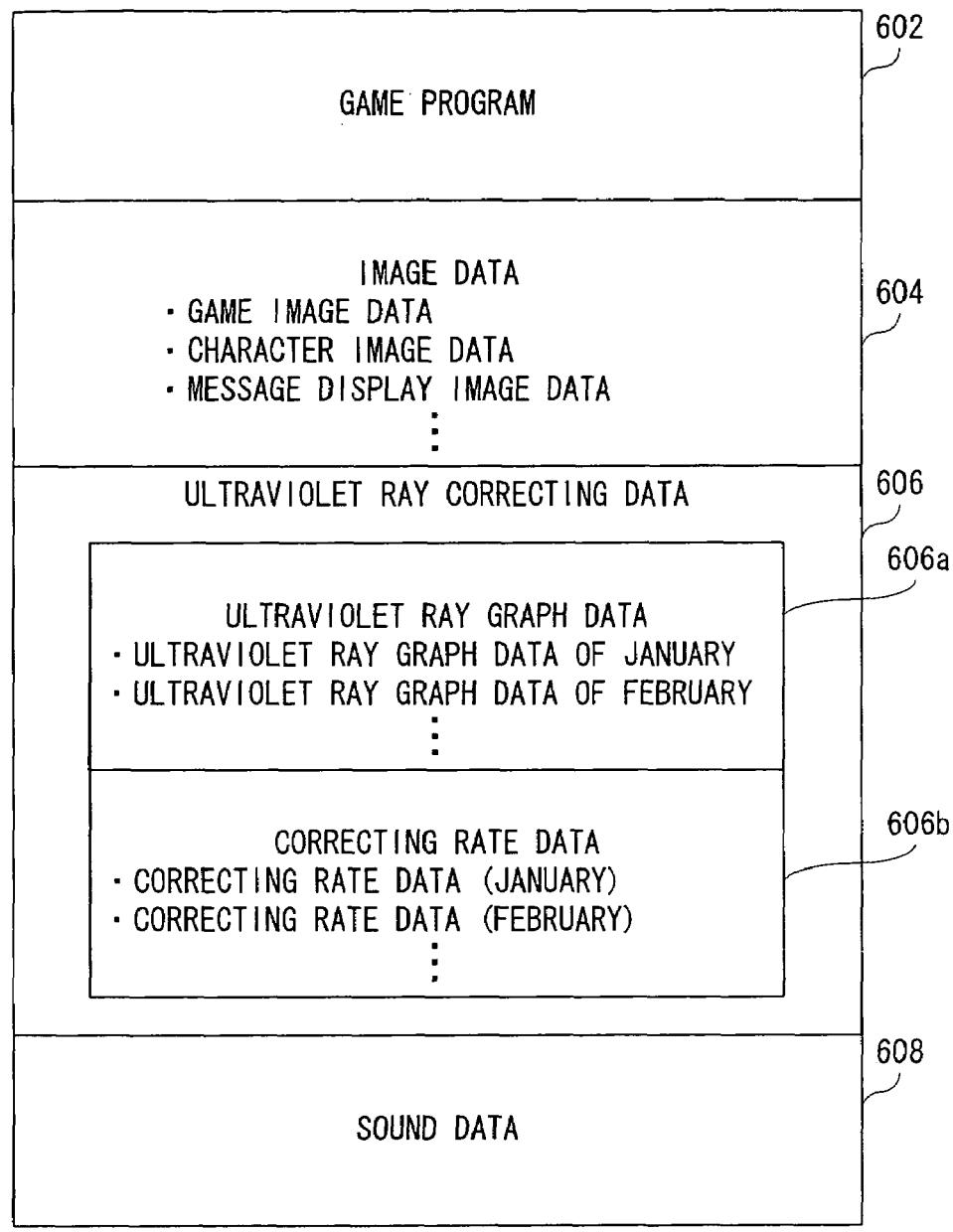
FIG. 3 is an illustrative view showing a memory map of a main memory shown in FIG. 2.

In addition, in the ROM 60, as FIG. 3 shows, a game program 602, image data (game image data, character image data, message display image data, and etc.,) 604, ultraviolet ray value correcting data 606, and sound data 608 are accommodated (stored) in advance. Furthermore, the ultraviolet ray value correcting data 606 is constructed of ultraviolet ray graph data 606a and correcting rate data 606b.

The ultraviolet ray graph data 606a is data of a graph showing a change in one day of a previously measured ultraviolet ray value in a specific location (in this embodiment, Japan (Kyoto)) by each predetermined period. In this embodiment, the change of the ultraviolet ray value in one day in each moth (January, February, . . . , November, December) is recorded. The change of the ultraviolet ray value in one day may be a change in time of the ultraviolet ray value measured regarding a specific day (15th day in each month, for example). In addition, it may be possible that the change in time of the ultraviolet ray value regarding one portion of the day or all days in the month is measured, a maximum value in the same time zone is obtained, an average value in the same time zone is calculated, and so forth. Furthermore, the ultraviolet ray value measured in each time zone (in this embodiment, 0-1 o'clock, 1-2 o'clock, . . . , 22-23 o'clock, 23-24 (midnight) o'clock,) is an ultraviolet ray value measured in all (one hour) or one portion (15 minutes, for example) in each time zone so as to obtain the maximum value during that time zone, calculate the average value, and so forth.

Figure 4:
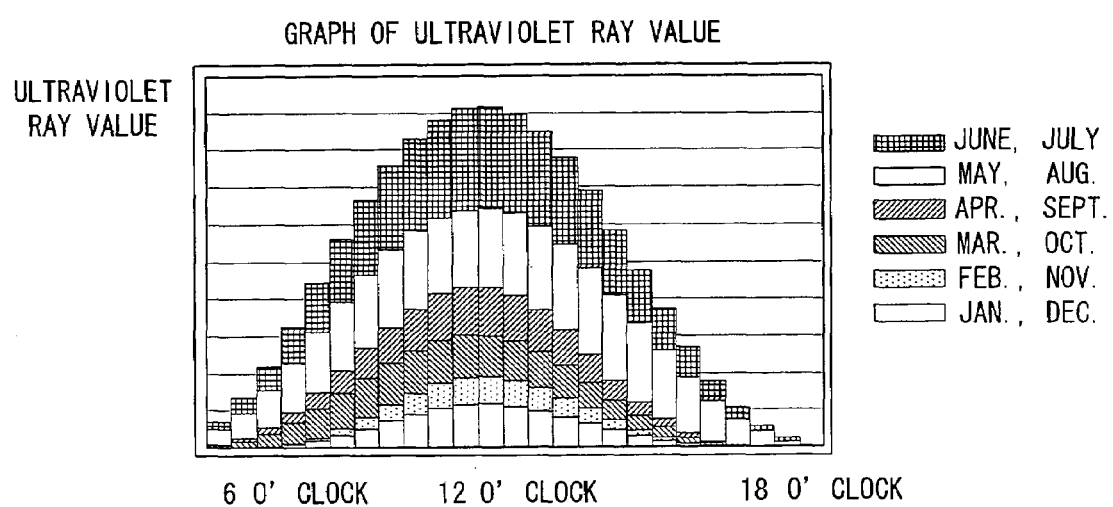
FIG. 4 is a graph of ultraviolet ray values based on ultraviolet ray graph data shown in FIG. 3.

FIG. 4 is one example of a graph rendered based on the ultraviolet ray graph data 606a. As understood from this FIG. 4, in each month, from a sunrise (from a time that the ultraviolet rays are detected) to around noon (approximately 12 o'clock), the ultraviolet ray value increases as time elapses, the ultraviolet ray value is the highest round noon, and thereafter, until a sunset (until the ultraviolet rays are not detected), the ultraviolet ray value gradually decreases. The ultraviolet ray value is 0 (zero) at sunset. In addition, in June and July, May and August, April and September, March and October, February and November, and January and December, it is understood that the change in the ultraviolet ray value is the same or approximately the same. Therefore, the ultraviolet ray graph data 606a need not be stored in such a manner as to correspond to each moth, and may be stored in such a manner as to correspond to the two months having the same or approximately same change in the ultraviolet ray value.

For the sake of illustration, the graph in May and August, and the graph in January and December are illustrated by the same white-colored bar. However, the ultraviolet ray value in the graph of May and August is larger, and this applies in this embodiment hereinafter.

The connecting rate data 606b is a table of data written in such a manner that a correcting rate, used when correcting the ultraviolet ray value, measured (detected) during the game, to a setting value, corresponds to each predetermined time period (in this embodiment, 1 hour), and in this embodiment, the table of data for each month is stored. Herein, the setting value is an ultraviolet ray value set in advance by a programmer or a developer of a game (game program 602) which uses the ultraviolet ray value.

Figure 5:
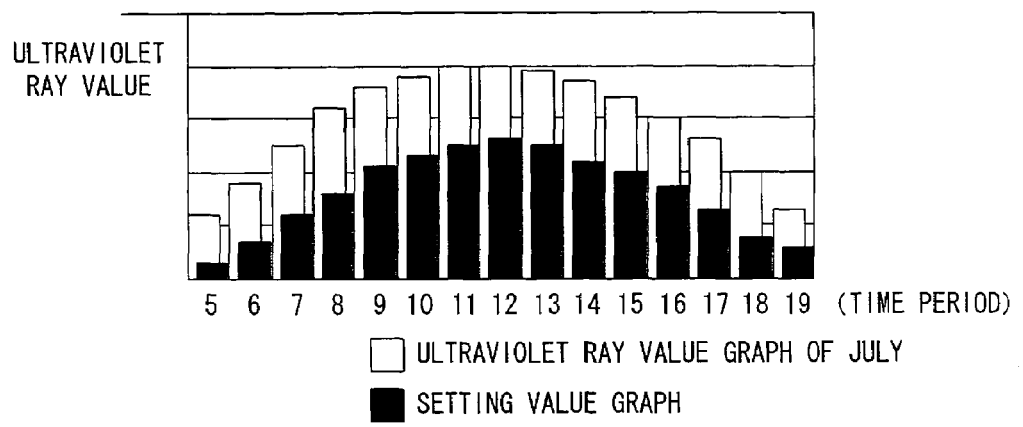
FIG. 5 (A) is a graph of ultraviolet ray values in July and a setting value graph of ultraviolet ray values in a game taking advantage of the ultraviolet ray value.

FIG. 5 (A) is one example of a graph shown by superimposing a graph of the ultraviolet ray value (ultraviolet ray value graph) rendered based on the ultraviolet ray graph data 606a of July (the same as June) and a graph of the setting value (setting value graph). As understood from this FIG. 5 (A), ultraviolet rays are strong in July, so the ultraviolet ray value exceeds the setting value in each time period (time zone). Furthermore, although not illustrated in FIG. 5 (A), ultraviolet rays are weak in January and February (see FIG. 4), so the ultraviolet ray value is lower than the setting value in each time zone. Thus, the ultraviolet ray value changes depending on a period during which the game is played, and the detected ultraviolet ray value is corrected in such a manner as to be equal to or approximately equal to the setting value. The correcting rate data 606b of July is shown as in FIG. 5 (B). Herein, the value of the correcting rate is an estimated value obtained by calculating a ratio of the ultraviolet ray value in each time zone shown by the ultraviolet ray value graph and the setting value graph. Such correcting rate data 606b is stored in such a manner so as to correspond to each month. Or, the correcting rate data 606b may be stored in such a manner so as to correspond to the ultraviolet ray graph data 606a.

However, as described above, in a case that the ultraviolet ray graph data 606a is stored in such a manner so as to correspond to the two months, similarly, the correcting rate data 606b may be stored in such a manner so as to correspond to the two months.

Figure 6:
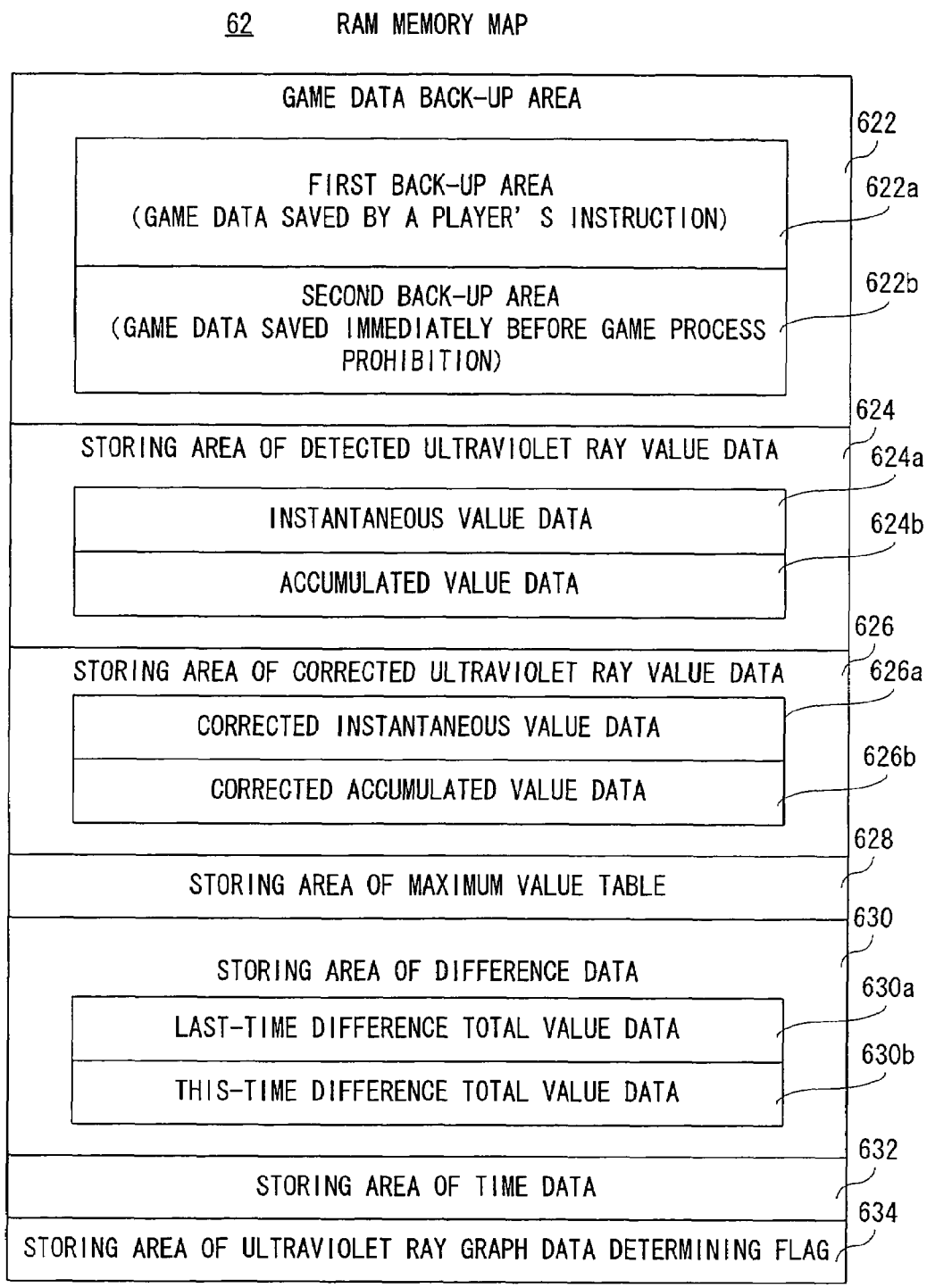
FIG. 6 is an illustrative view showing a memory map of a RAM shown in FIG. 2.

As shown in FIG. 6, in the RAM 62, a game data backup area 622, a storing area 624 of the detected ultraviolet ray value data, a storing area 626 of the corrected ultraviolet ray value data, a storing area 628 of a maximum value table, storing area 630 of difference data, a storing area 632 of time data, and a storing area 634 of an ultraviolet ray graph data determining flag are provided.

The game data backup area 622 is an area for recording game data (backup data), and constructed of a first backup area 622a and a second backup area 622b. In this embodiment, the first backup area 622a stores the game data saved by an instruction of a player, and the second backup area 622b stores the game data automatically saved immediately before prohibiting a game process.

The storing area 624 stores the ultraviolet ray value data detected by the ultraviolet ray sensor 32a. More specifically, data (instantaneous value data) 624a regarding an instantaneous value of the ultraviolet ray, and data (accumulated value data) 624b regarding an accumulated value of the ultraviolet ray are stored. The instantaneous value of the ultraviolet ray is detected in each predetermined time period (hereinafter briefly referred to as a "detecting unit time-period"). In addition, in this embodiment, the accumulated value data of the ultraviolet ray has the estimated value calculated according to Equation 1.

Accumulated value data=Σ(instantaneous value data× detecting unit time-period) [Equation 1]

However, the accumulated value data is data that the instantaneous value data of each detecting unit time-period from the game is started until the present time is added.

The storing area 626 stores the ultraviolet ray value data having the ultraviolet ray value data detected by the ultraviolet ray sensor 32a corrected. That is, corrected instantaneous value data 626a that corrected the instantaneous value data 624a, and corrected accumulated value data 626b calculated based on the corrected instantaneous value data 626a are stored.

In the storing area 628, the maximum value table described later (see FIG. 16) is stored. In addition, in the storing area 630, difference total data obtained when executing an ultraviolet ray value correcting process (3) described later is stored, and as illustrated, difference total value data of last time (last-time difference total value data) 630a, and the difference total value data of this time (this-time difference total value data) 630b are stored. Furthermore, in the storing area 632, data of a time (time data) obtained when executing an ultraviolet ray value correcting process (3) described later is stored. Still furthermore, in the storing area 634, an ultraviolet ray graph data determining flag determined when executing an ultraviolet ray value correcting process (3) described later is stored. This ultraviolet ray graph data determining flag is constructed of a register, and the register has a bit corresponding to each month (ultraviolet ray graph data 606a), and a data value of the bit corresponding to the determined ultraviolet ray graph data 606a is rendered "1" (flag is turned on), and the data value of the bit corresponding to the other ultraviolet ray graph data 606a is rendered "0" (zero) (flag is turned off).

In the game apparatus 10, for example, it is possible to execute a game which uses the ultraviolet rays included in sunlight, detected by the ultraviolet ray sensor 32a provided in the game cartridge 32. This is suggested in view of an influence on a growth of children who play a video game indoors.

However, intensity of the ultraviolet rays (ultraviolet ray value) differs (changes) depending on a period (date/month, season, and etc.,), a location (area (prefecture, country)), or a time during which the game is played, so that if the detected ultraviolet ray value is directly used for the game, it is not possible to apply a constant enhanced aspect of the game, as a result of the change, thus resulting in a collapse in game balance.

In addition, if a player plays the game excessively, the player can be intensely exposed to ultraviolet rays, thus resulting in a sunburn.

As a consequence, in this illustrative embodiment, by correcting the detected ultraviolet ray value, the constant enhanced aspect of the game is applied, and if the game detects exposure to an excessive amount of ultraviolet rays, over a given period of time, the game process prohibited. Briefly described, while the game using the ultraviolet ray value is played, the ultraviolet ray value is detected, and the detected ultraviolet ray value is corrected in such a manner as to be equal to or approximately equal to the setting value. Furthermore, an amount of ultraviolet ray (accumulated value) exposure during the game play is detected, and if the game determines that a first predetermined value of the ultraviolet ray accumulation has been met, a warning is issued, and furthermore, if the game determines that a second, greater, predetermined value of accumulation has been met, which is larger than the first predetermined value, the game process is forcedly prohibited.

Figure 7:
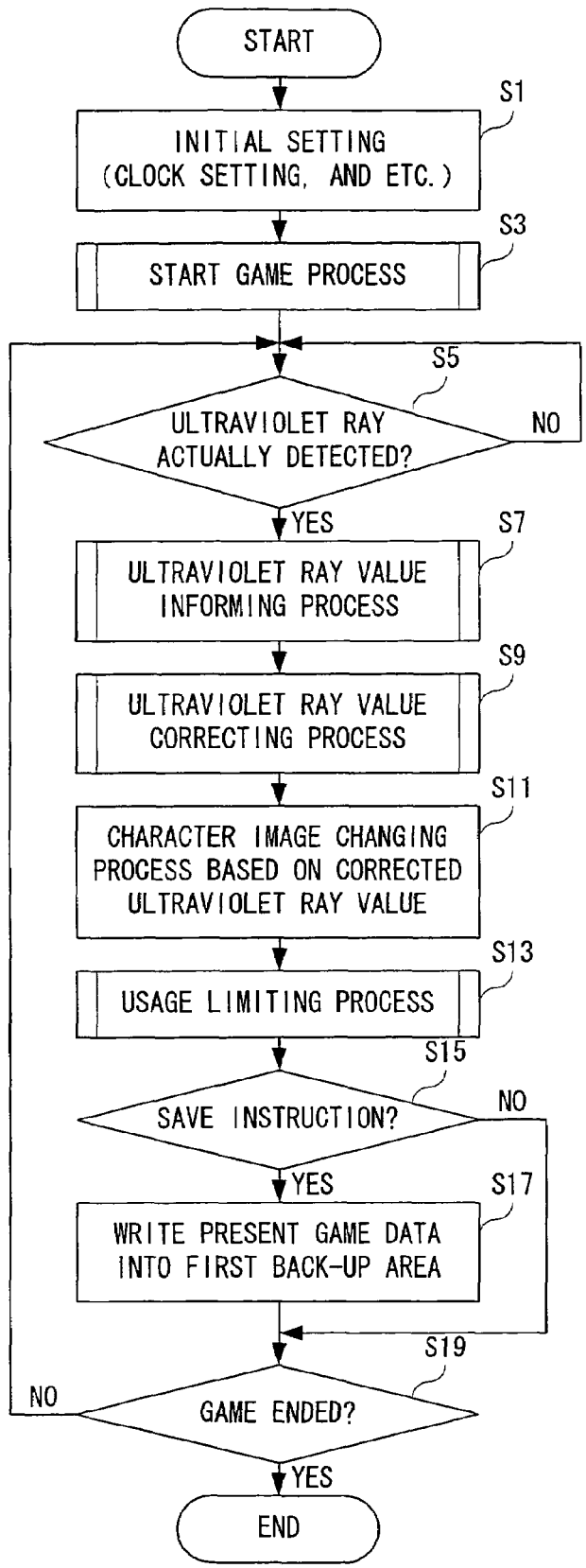
FIG. 7 is a flowchart showing a game process of a CPU shown in FIG. 2.

More specifically, the CPU 40 shown in FIG. 2 executes a game process (game program 602) shown in FIG. 7. As shown in FIG. 7, when starting the game process, an initial setting is executed in a step S1. That is, a year/month/day, a time, or a game mode, etc., are set in advance by the player.

In a succeeding step S3, a game starting process described later is executed (see FIG. 8). In a step S5, it is determined whether or not ultraviolet rays are actually detected. That is, the CPU 40 outputs to the ROM 60 a transmission request of an input from the ultraviolet ray sensor 32*a*, and determines whether or not the ultraviolet ray value data transmitted from the ROM 60 is equal to or larger than a predetermined value. Herein, the predetermined value is a numerical value set in order to prevent an erroneous detection of the ultraviolet ray value, and determined by an experiment, and etc. If "NO" in the step S5, that is, if the ultraviolet ray value data is less than the predetermined value, it is determined that the ultraviolet ray is not actually detected, and the process returns to the same step S5.

On the other hand, if "YES" in the step S5, that is, if the ultraviolet ray value data is equal to or greater than the predetermined value, it is determined that the ultraviolet ray is actually detected, and in a step S7, an ultraviolet ray value informing process described later is executed (see FIG. 9). Next, in a step S9, an ultraviolet ray value correcting process described later is executed (see FIG. 11, FIG. 13, FIG. 22-FIG. 24), and in a step S11, based on the corrected ultraviolet ray value, that is, the corrected instantaneous value data 626*a* and the corrected accumulated value data 626*b*, a changing process of the character image is executed. In correspondence with the corrected instantaneous value data 626*a* and the corrected accumulated value data 626*b*, it is possible to grow (develop) a player character and a non-player character such as a plant, and the image in that case is changed. Thus, the corrected ultraviolet ray value (instantaneous value and accumulated value) is reflected in the game so that it is possible to consistently apply an enhanced aspect of the game, without game play being affected by a regional or seasonal change of the ultraviolet ray value.

In a succeeding step S13, a usage limiting process described later is executed (see FIG. 26, and FIG. 27), and in a step S15, it is determined whether or not there is a save instruction. If "NO" in the step S15, that is, unless there is the save instruction, the process directly advances to a step S19. On the other hand, if "YES" in the step S15, that is, if there is the save instruction, the process writes the present game data into the first backup area 622*a* in a step S17, and then, advances to the step S19. That is, in the step S17, the game data, saved (updated) one after another into the work memory 42 according to a proceeding of the game, is recorded (saved) into the first backup area 622*a* by the CPU 40.

In the step S19, it is determined whether or not the game is ended. That is, it is determined whether or not an instruction to end the game is applied by the player, or whether or not it is game-over. If "NO" in the step S19, that is, unless the game is ended, the process directly returns to the step S5 so as to continue the game. On the other hand, if "YES" in the step S19, that is, if the game is ended, the process directly ends the game process.

It is noted that, although omitted in the game process of this illustrative embodiment, in the game process, not only a process of a character image change but also another game process is executed. That is, an image process, in which: the player character is moved according to the operation of the player, the non-player character is moved, the image is updated in the game space, and so forth. A displaying process, of a message to be displayed in correspondence with the proceeding of the game, a sound outputting process, for outputting a music (BGM) and a sound (sound effect), etc., all necessary for the game, are also executed.

Figure 8:
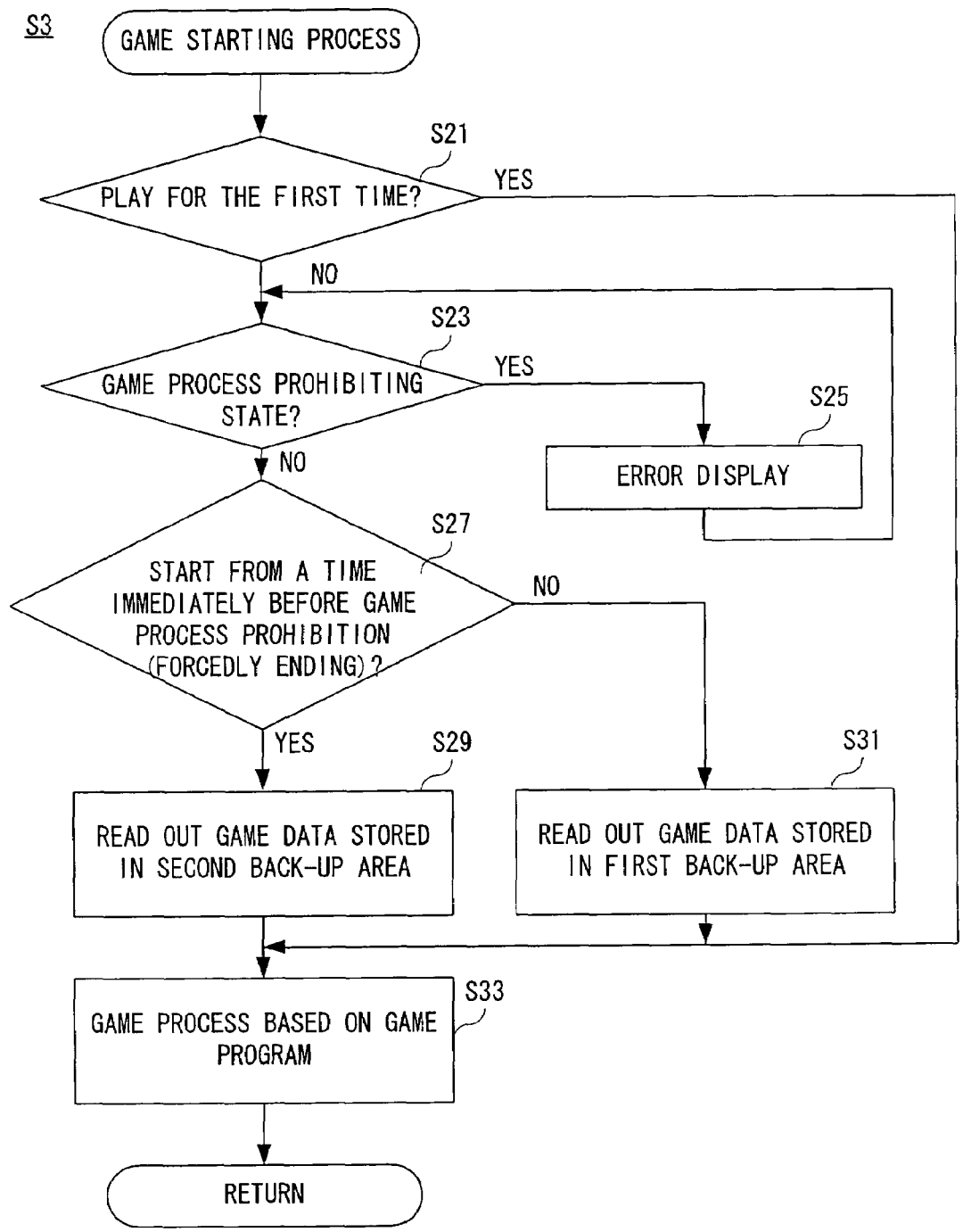
FIG. 8 is a flowchart showing a game starting process of the CPU shown in FIG. 2.

As shown in FIG. 8, when starting the game starting process, the CPU 40 determines whether or not the game is being played for the first time (from a start) in a step S21. More specifically, prior to the start of the game, the CPU 40 displays a menu screen in the LCD 14, and determines whether or not the player elects to start a new game. If "YES" in the step S21, that is, if the player is playing the game for the first time, the process directly advances to a step S33. On the other hand, if "NO" in the step S21, that is, if the player is playing a portion of the game that the player last played, it is determined whether or not a game process prohibiting state is turned on, in a step S23. That is, in the usage limiting process in the step S13 shown in FIG. 7, it is determined whether or not the game process prohibiting state is enabled.

If "YES" in the step S23, that is, if the game process prohibiting state is currently enabled, the process performs a message display (error display) such as "Now, not possible to start the game. Please wait.," in a step S25 and then returns to the step S23. That is, the process waits until the game process prohibiting state is disabled.

On the other hand, if "NO" in the step S23, that is, unless the game process prohibiting process is enabled, the process determines whether or not to start the game from a point immediately before a game-process was prohibited, or forcedly ended, in a step S27. More specifically, the process determines whether or not the player inputs a reading-out instruction of the game data stored in the second backup area 622*b*.

If "YES" in the step S27, that is, if starting the game from a point immediately before the game-process was prohibited or forcedly ended, the process reads out the game data stored in the second backup area 622*b* in a step S29, and advances to the step S33. On the other hand, if "NO" in the step S27, that is, if starting the game from a point in which the game was saved by the instruction of the player, determining that the game is not started from a point immediately before the game-process was prohibited or forcedly ended, the process reads out the game data stored in the first backup area 622*a* in a step S31, and advances to the step S33. That is, when resuming the game from the portion that the player last played, it is possible to select the game data saved by a player, or the game data automatically saved immediately before the game was forcedly ended.

In the step S33, the game process, according to the game data read out in the step S29 or the step S31, or the game process from the start, is started based on the game program 602, and the game starting process is returned.

Figure 9:
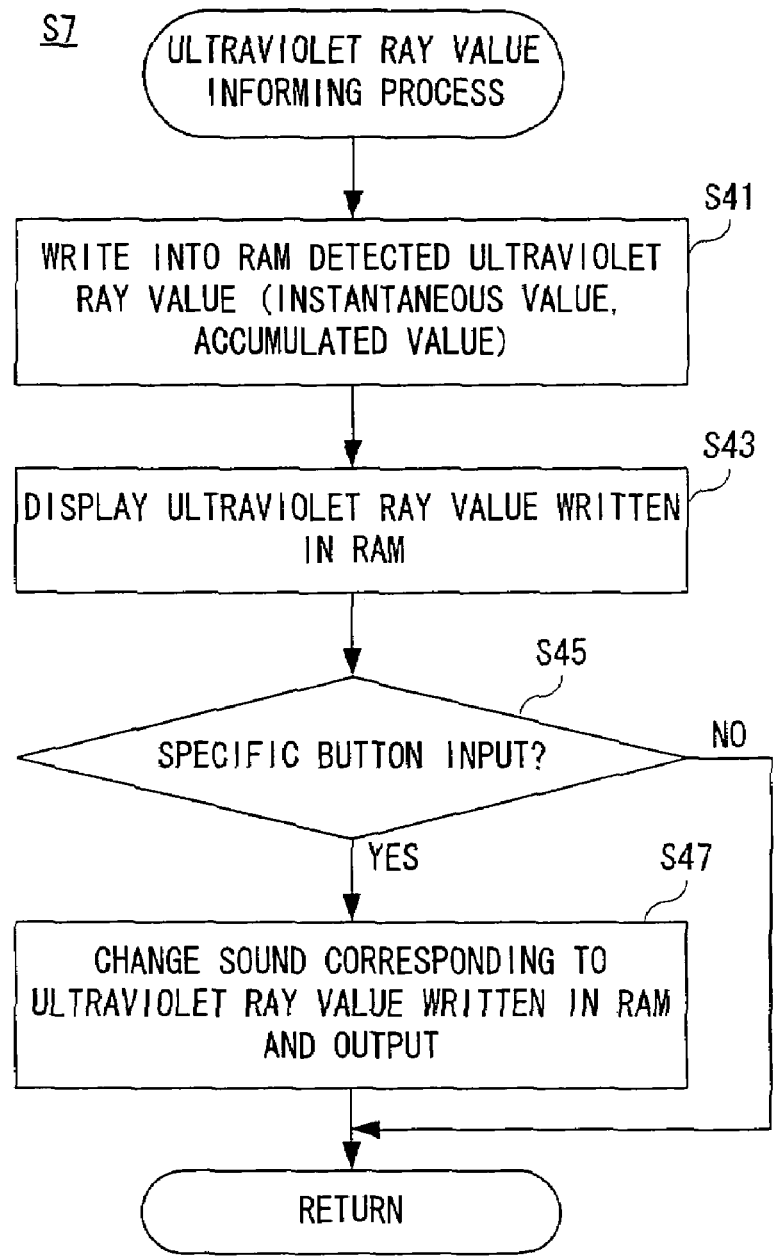
FIG. 9 is a flowchart showing an ultraviolet ray value informing process of the CPU shown in FIG. 2.

As shown in FIG. 9, when starting the ultraviolet ray value informing process, the CPU 40 writes the detected ultraviolet ray value into the RAM 62 in a step S41. That is, the CPU 40 outputs to the ROM 60 a transmission request of an input of the ultraviolet ray sensor 32a, and writes (stores) into the storing area 624 each of the instantaneous value data 624a of the ultraviolet ray value obtained from the ROM 60, and the accumulated value data 624b calculated according to Equation 1.

Although omitted in FIG. 7, if "YES" is determined in the step S5, the data of the time measured by the clock IC 66 is stored, and a detecting time-period is evaluated as a difference from the present time. It is noted that the detecting time of the ultraviolet ray value may be measured by providing an additional timer.

In a succeeding step S43, the ultraviolet ray value written in the RAM 62 is displayed. That is, the CPU 40 refers to the instantaneous value data 624a and the accumulated value data 624b stored in the RAM 62, and displays (visually displays) the instantaneous value and the accumulated value, by displaying the numerical value or a bar graph in one portion or the entire game screen in the LCD 14. However, like an antenna display showing an intensity of radio wave of a portable phone receiver, a display (color, luminosity) or the number of specific characters (mark of the Sun, for example) may be changed.

Then, in a step S45, it is determined whether or not there is a specific button input (requesting informing by the sound). That is, the CPU 40 determines whether or not a specific operating signal is input from the key matrix 44. If "NO" in the step S45, that is, unless the specific operating signal is input from the key matrix 44, the process determines that there is no request for informing by the sound, and directly returns the ultraviolet ray value informing process.

On the other hand, if "YES" in the step S45, that is, if the specific operating signal is input from the key matrix 44, determining that there is the request for informing by the sound, the process changes the sound in correspondence with the size of the ultraviolet ray value written in the RAM 62 in a step S47, and outputs the sound. Then, the process returns the ultraviolet ray value informing process. That is, the CPU 40 chances a kind (single sound⇔chord, or chord⇔another chord) of the sound (BGM, sound effect, voices or mimicking sound of the game character) output from the speaker 34, changes the intensity (volume of the sound), changes a tone (high or low of a frequency), changes a tempo (strength of a pitch), changes a melody, and so forth. It is noted that the sound may be changed as a result of a combination of two or more of these.

Next, a description will be made regarding the ultraviolet ray value correcting process (S9) shown in FIG. 7. It is noted that this process differs depending on whether: the month and the time are known (ultraviolet ray value correcting process (1)), only the time is known (ultraviolet ray value correcting process (2)), and the month and the time are not known (ultraviolet ray value correcting process (3)), so these cases will be described one by one.

It is noted that the month (and day) and the time, as described above, are items arbitrarily set before the player starts the game process.

In the ultraviolet ray value correcting process (1), the month and the time are known, so that as shown in FIG. 10 (A), it is possible to correct the detected ultraviolet ray value by the correcting rate data 606b corresponding to the month. Therefore, in such a case, the ultraviolet ray graph data 606a needs not to be stored into the ROM 60.

However, as understood from FIG. 10 (B), when it is not possible to exactly detect the ultraviolet ray value depending on weather and an operating situation of the player (direction of a position of the game apparatus 10 (ultraviolet ray sensor 32a) toward the Sun, and etc., for example), there is a case that the ultraviolet ray value is regionally (at a certain time) low so that it is considered to make a correction in such a manner that the data of the setting value graph described above is included and stored in the ultraviolet ray value correcting data 606 of the ROM 60, and without using the correcting rate data 606b, for example, rendered equal to or approximately equal to the setting value of the time (time zone) corresponding to the ultraviolet ray value actually detected. In this case, although there will be more operation processes, it is possible to surely bring the data closer to the setting value.

Figure 11:
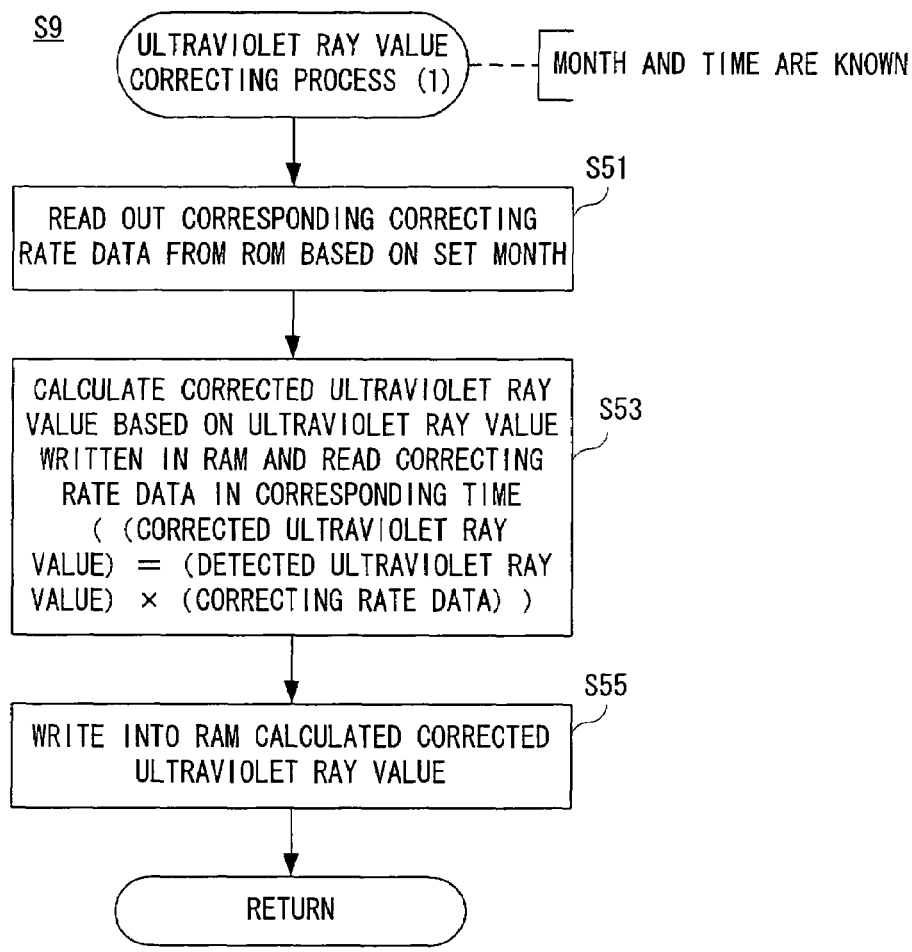
FIG. 11 is a flowchart showing one example of an ultraviolet ray value correcting process of the CPU shown in FIG. 2.

More specifically, as shown in FIG. 11, when starting the ultraviolet ray value correcting process (1), the CPU 40 reads out the corresponding correcting rate data 606b from the ROM 60 based on the set month in a step S51. In a succeeding step S53, based on the ultraviolet ray value (instantaneous value data 624a and the accumulated value data 624b) written in the RAM 62, and the read correcting rate data 606b in the corresponding time, the corrected ultraviolet ray value (the corrected instantaneous value data 626a and the corrected accumulated value data 626b) is calculated. More specifically, the corrected ultraviolet ray value is calculated according to Equation 2.

corrected ultraviolet ray value=detected ultraviolet ray value×correcting rate data [Equation 2]

It is noted that the detected ultraviolet ray value is multiplied to the correcting rate (data) of the time (time zone) which is the same as the detecting time (time zone).

Then, in a step S55, the process writes, into the storing area 626, the calculated corrected ultraviolet ray value, that is, the corrected instantaneous value data 626a and the corrected accumulated value data 626b, and returns.

In one ultraviolet ray value correcting process (1), the month/date and time are known, so that using the relevant correcting rate data 606b, it is possible to promptly correct the detected ultraviolet ray value.

In a second ultraviolet ray value correcting process (2), the time is known. However, the month is not known so that it is not known which month of the correcting rate data 606b is used. Therefore, in the second ultraviolet ray value correcting process (2), by comparing the detected ultraviolet ray value with all of the ultraviolet ray graph data 606a (of each month), one set of most approximate ultraviolet ray graph data 606a is determined. Then, using the correcting rate data 606b corresponding to the determined ultraviolet ray graph data 606a, the detected ultraviolet ray value is corrected.

Figure 12:
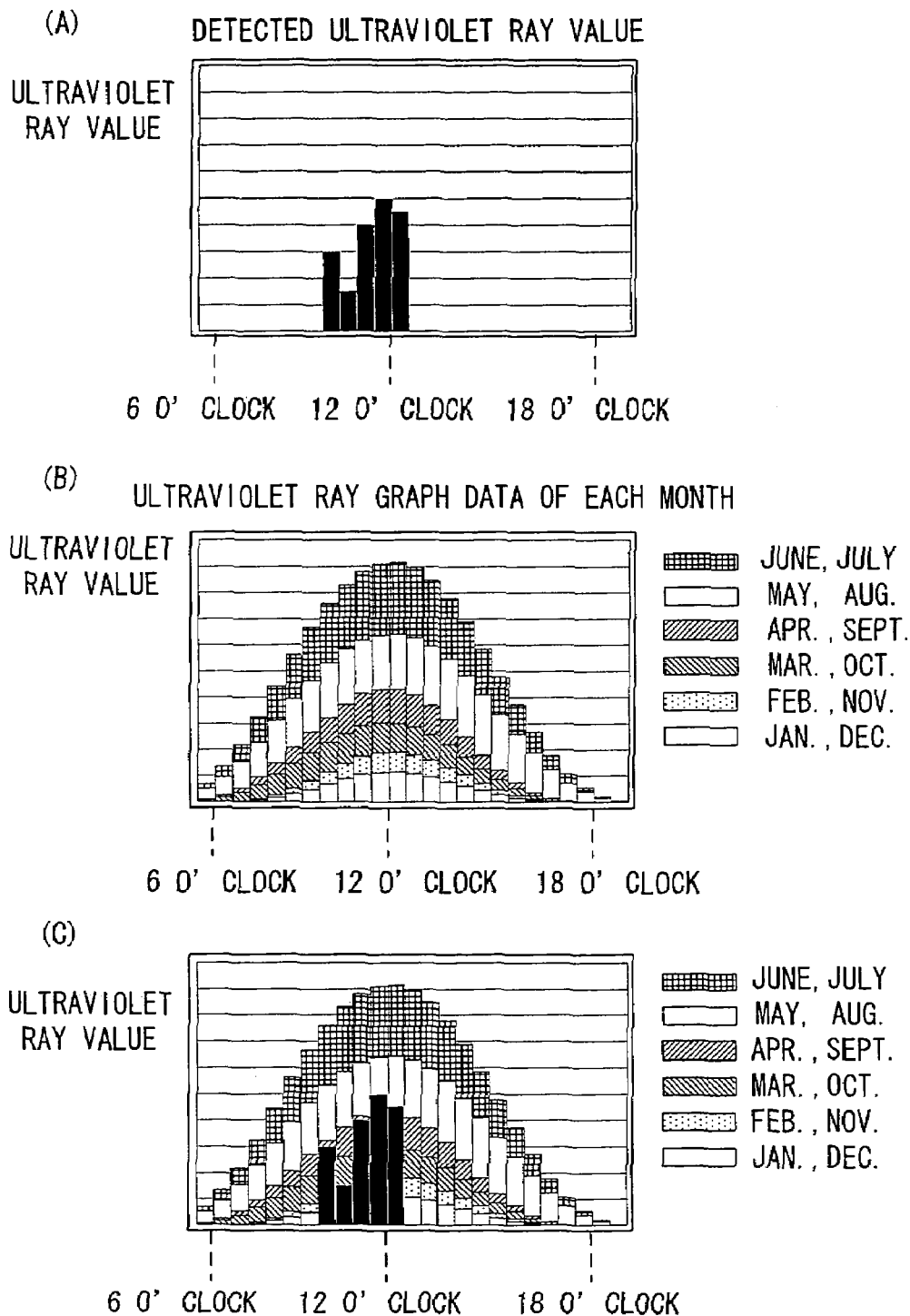
FIG. 12 (A) is a graph showing one example of a change in time of the detected ultraviolet ray value.

By comparing the detected ultraviolet ray value as shown in FIG. 12 (A) with all (of each month) the ultraviolet ray graph data 606a as shown in FIG. 12 (B), the best approximate set of ultraviolet ray graph data 606a is determined. As understood from FIG. 12 (C) displayed by superimposing the graph shown in FIG. 12 (A) and the graph shown in FIG. 12 (B), the detected ultraviolet ray value shown in FIG. 12 (A) is the closest to the change in time of the ultraviolet ray value in April (the same as September). However, in reality, an absolute value of a difference between the detected ultraviolet ray value and the ultraviolet ray value indicated by each ultraviolet ray graph data 606*a* in the same time (time zone) is detected, and one set of ultraviolet ray graph data 606*a* having the smallest difference is determined. Furthermore, using the correcting rate data 606*b* corresponding to the month (April and September) of the chosen ultraviolet ray graph data 606*a*, the detected ultraviolet ray value is corrected.

However, as described above, if storing the setting value, the ultraviolet ray value may be corrected in such a manner so as to be equal to or approximately equal to the setting values so that the ultraviolet ray graph data 606*a* and the corresponding correcting rate data 606*b* need not to be specified.

Figure 13:
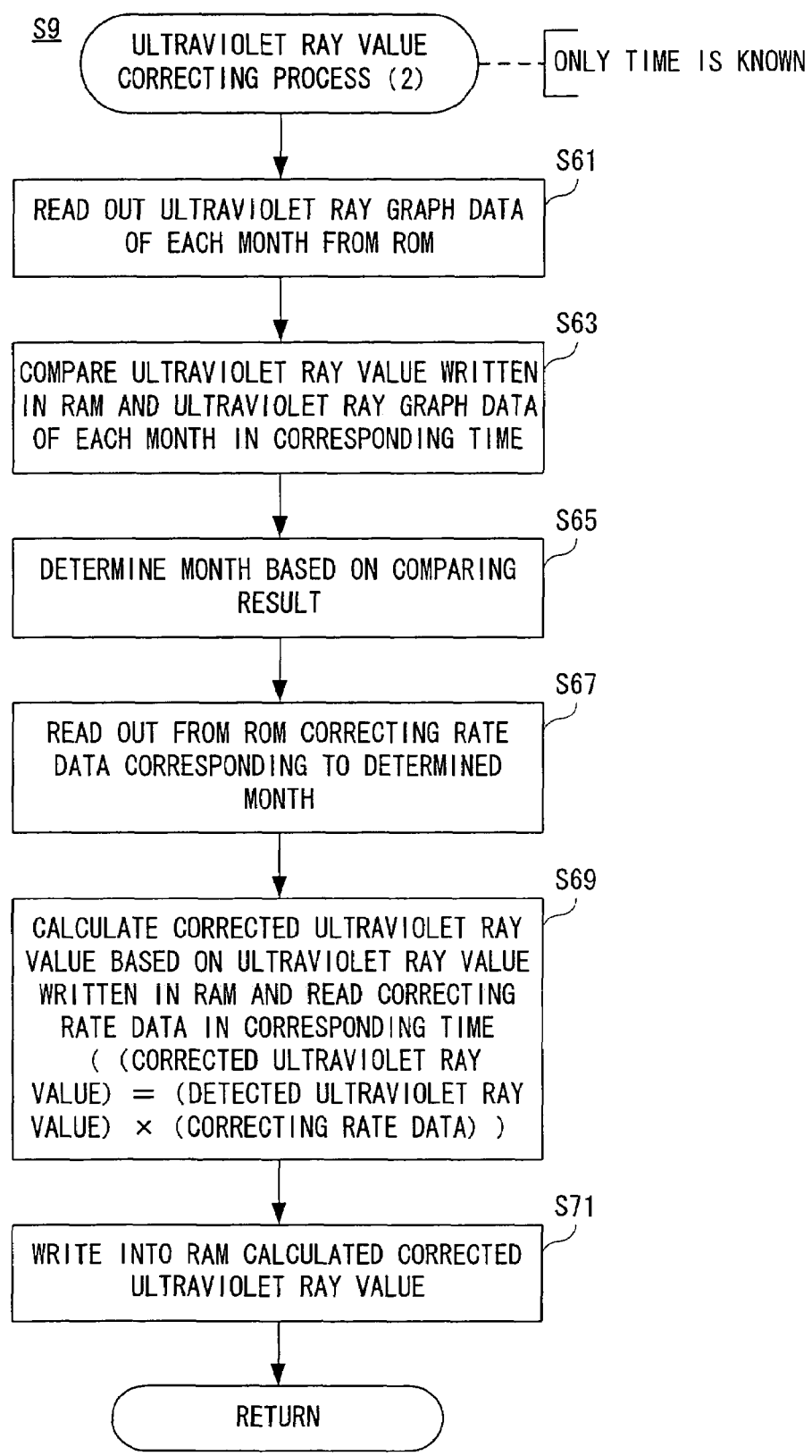
FIG. 13 is a flowchart showing another example of the ultraviolet ray value correcting process of the CPU shown in FIG. 2.

More specifically, the CPU 40 executes the ultraviolet ray value correcting process (2) according to a flowchart shown in FIG. 13, and the same process as the ultraviolet ray value correcting process (1) will be only briefly described. As shown in FIG. 13, when starting the ultraviolet ray value correcting process (2), the CPU 40 reads out the ultraviolet ray graph data 606*a* of each month from the ROM 60 in a step S61. In a succeeding step S63, the ultraviolet ray value data written in the RAM 62 and the ultraviolet ray graph data 606*a* of each month in the corresponding time are compared. In addition, in a step S65, the month is determined based on a comparing result in the step S63. That is, the month that has the highest degree of approximation, and corresponds to the ultraviolet ray graph data 606*a* is determined. As described above, the absolute value of the difference between the detected ultraviolet ray value data and the ultraviolet ray graph data of each month in the same time (time zone) is evaluated, and the month having the smallest difference, compared to the ultraviolet ray graph data 606*a*, is determined.

In a succeeding step S67, the correcting rate data 606*b* corresponding to the determined month is read out, and in a step S69, in the corresponding time, the corrected ultraviolet ray value (corrected instantaneous value data 626*a* and the corrected accumulated value data 626*b*) is calculated according to Equation 2 from the ultraviolet ray value written in the RAM 62 and the read correcting rate data. Furthermore, the calculated corrected ultraviolet ray value is written into the storing area 626, and the ultraviolet ray value correcting process (2) returns.

In this ultraviolet ray value correcting process (2), only the time is known, so that by comparing the detected ultraviolet ray value with the ultraviolet ray graph data 606*a* at the corresponding time, it is possible to easily determine the correcting rate data 606*b* used for correcting the detected ultraviolet ray value.

It is noted that in the ultraviolet ray value correcting process (2), the month is determined in the step S65, however, if the ultraviolet ray graph data 606*a* and the correcting rate data 606*b* are compared with each other and stored without determining the month, the set of ultraviolet ray graph data 606*a* is determined, and the corresponding correcting rate data 606*b* is used, thus making it possible to calculate the corrected ultraviolet ray value.

Then, in the ultraviolet ray value correcting process (3), both the month and the time are unknown, so that based on the detected ultraviolet ray value and the ultraviolet ray graph data 606*a*, it is not possible to easily determine the correcting rate data 606*b*. Therefore, after describing the basic concept of the ultraviolet ray value correcting process (3), the actual ultraviolet ray value correcting process (3) will be described below.

As described above, both the month and the time are unknown, thus a relative time-period table (relative time-period table), as shown in FIG. 14, is prepared. This relative time-period table is an example in which a time period of one day (24 hours) is divided into 12 portions (from A o'clock to L o'clock in alphabetical order), and one week is 10 days (in order of day I to day X). In an actual time period in this relative time-period table, similar to the manner in which 2 o'clock comes after 1 o'clock, 3 o'clock comes after 2 o'clock, . . . , 1 o'clock comes after 24 o'clock (12 midnight), it is assumed that B o'clock comes after A o'clock, C o'clock comes after B o'clock, . . . , A o'clock comes after L o'clock. Regarding the days of the week, similar to the manner in which Monday comes after Sunday, Tuesday comes after Monday, . . . , Monday comes after Sunday, it is assumed that day II comes after day I, day III comes after day II, . . . , day I comes after day X.

As shown in FIG. 15, a maximum value of the ultraviolet ray value (instantaneous value of the ultraviolet ray value) detected in each time period (zone) of each day of the week is registered in a relevant location of the relative time-period table (hereinafter referred to as a "maximum value table"). Or, an average value of the ultraviolet ray value detected in each time period (zone) may be registered in the relevant location of the relative time-period table. However, a blank column indicates that the ultraviolet ray value is 0 (zero). In an example of the maximum value table shown in this FIG. 15, numerical values of the detected ultraviolet ray value detected during day I in the first week and day III in the second week are input in a relevant column of the relative time-period. In addition, a day, which is today, is day IV in the second week, and is illustrated by rendering column completely black in FIG. 15.

Figure 16:
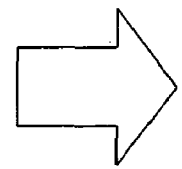
FIG. 16 (A) is an illustrative view showing another example of the maximum value table.

In this embodiment, in each week (corresponds to 10 days), the maximum value table is updated. Therefore, in the maximum value table in FIG. 15, today is day IV in the second week so that the ultraviolet ray values from day I to day IV in the first week, indicated by adding diagonal lines in FIG. 15, are to be deleted (discarded). That is, as shown in FIG. 16 (A), regarding the maximum value table, the columns for day I to day X are prepared, a writing of the detected ultraviolet ray value is started from day I, and the detected ultraviolet ray values detected according to the day (day of the week) and the time period are written one after another. In addition, upon completion of writing to day X, the process returns to the next day I, and the previous ultraviolet ray value for that day is overwritten. Thus, the maximum value table is updated.

Thus, using the maximum value of each time period (zone) of this maximum value table, the correcting rate data of the ultraviolet ray value is evaluated. Briefly, from the ultraviolet ray value in a 10-day period including today, the maximum value in each time period (A o'clock-L o'clock) is extracted. In an example of the maximum value table shown in FIG. 16 (A), at A o'clock the maximum is 140 on day III, at B o'clock the maximum is 100 on day IV, at C o'clock the maximum is 20 on day X, between D o'clock and H o'clock the value is 0 (zero), at I o'clock the maximum is 50 on day V, at J o'clock the maximum is 110 on day V, at K o'clock the maximum is 170 on day II, and at L o'clock the maximum is 150 on day VI.

It is noted that in a simple method in another illustrative embodiment, it is possible to evaluate the correcting rate data based on only the ultraviolet ray value on a certain day (preceding day, for example). However, due to weather and an operating situation of the player (orientation of the game apparatus 10 (ultraviolet ray sensor 32*a*) toward sunlight, for example), a variance occurs in the detected ultraviolet ray value, and taking into account the days on which the player does not play, in this embodiment, the maximum value in each time zone is extracted as a result of the ultraviolet ray being detected for 10 days.

In addition, in a case of extracting the maximum value once, for executing the ultraviolet ray value correcting process (3) using the maximum value, as shown in FIG. 16 (B), the table, in which the extracted maximum value and the second largest ultraviolet ray value are written, next to the corresponding days of the week, may be stored. Herein, the second largest ultraviolet ray value is stored is to ensure that, as described above, if the maximum value is deleted, when deleting the ultraviolet ray value that is 10 or more days old from the maximum value table, the ultraviolet ray value correcting process (3) is correctly executed.

Figure 17:
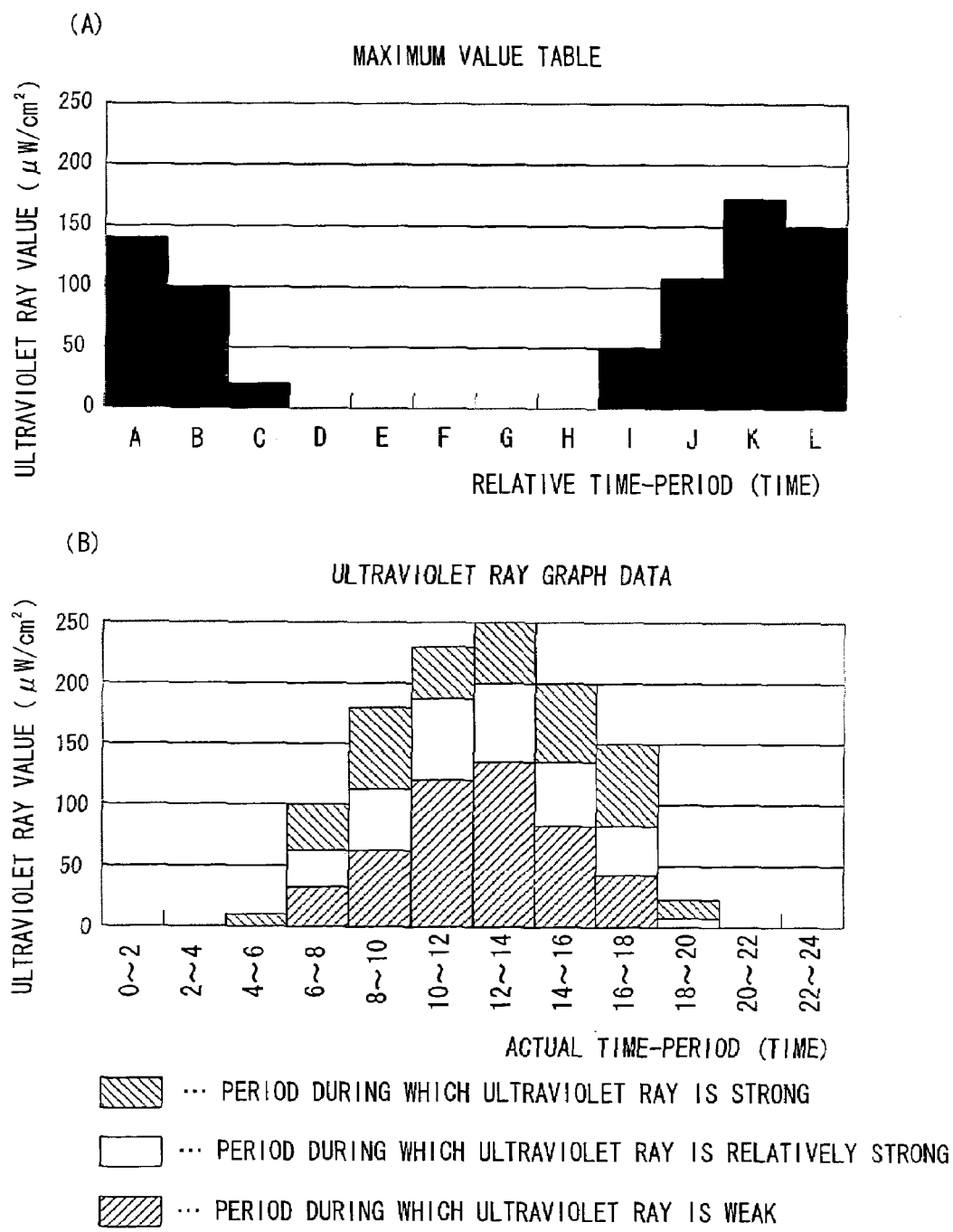
FIG. 17 (A) is a graph of the ultraviolet ray value based on the maximum value table.

Next is a description teaching one method of how to specify the ultraviolet ray graph data 606a for determining the correcting rate data 606b. A graph based on the maximum value table shown in FIG. 16 (A) is shown in FIG. 17 (A). On the other hand, a graph based on the ultraviolet ray graph data obtained by previous measurement is shown in FIG. 17 (B). It is noted that within this graph, for the sake of simplicity, a graph based on the ultraviolet ray graph data during a period that the ultraviolet ray value is strong, a graph based on the ultraviolet ray graph data during a period that the ultraviolet ray value is relatively strong, and a graph based on the ultraviolet ray graph data during a period that the ultraviolet ray value is weak are shown. In addition, the ultraviolet ray values of each graph shown in FIG. 17 (B) are shown in Table 1. It is noted that a time (time zone) during which the ultraviolet ray value is rendered 0 (zero) in all the graphs is omitted.

TABLE 1

| ULTRAVIOLET RAY VALUE | ACTUAL TIME PERIOD | | | | | | | |
|---|---|---|---|---|---|---|---|---|
| | 4-6 | 6-8 | 8-10 | 10-12 | 12-14 | 14-16 | 16-18 | 18-20 |
| STRONG PERIOD | 10 | 100 | 180 | 230 | 250 | 200 | 150 | 25 |
| RELATIVELY STRONG PERIOD | 0 | 60 | 110 | 180 | 200 | 130 | 80 | 10 |
| WEAK PERIOD | 0 | 30 | 60 | 110 | 130 | 80 | 40 | 0 |

As understood from FIG. 17 (A) and FIG. 17 (B), in the graph based on the maximum value table, there occurs a deviance in time compared to the graph based on the ultraviolet ray graph data so that it is not possible to specify a single ultraviolet ray graph data set 606a by a simple comparison. As a consequence, a specified relative time-period in the maximum value table (A o'clock, for example) is set to each of the actual time-periods one by one (0-2 o'clock, 2-4 o'clock, . . . , 20-22 o'clock, 22-24 o'clock), that is, by shifting the detected ultraviolet ray value, a difference total of the ultraviolet ray values in each case is calculated. Then, the set of ultraviolet ray graph data 606a with a minimum difference total is specified (determined), and in addition, the actual time-period at that time is obtained (recorded).

The method will be described below, and for the sake of simplicity, only a case that the graph (hereinafter referred to as a "graph A") based on the maximum value table and the graph (hereinafter referred to as a "graph B") based on the ultraviolet ray graph data during a period that the ultraviolet ray value is weak are compared to calculate the difference total, and the case where one ultraviolet ray graph data set is determined will be described.

FIG. 18 (A) is a graph in which the relative time-period A o'clock is set to the actual time-period 0-2 o'clock, and the graph A and the graph B are superimposed and shown. As understood from this FIG. 18 (A), the graph A and the graph B have almost no overlapped portion, and therefore, it can be said that the time period deviates. In addition, the difference total between the graph A and the graph B is 1120. Herein, the difference total is a sum of the absolute value of the difference between the ultraviolet ray value of the graph A and the graph B of each time period (zone).

That is, the difference of each time period is 140 between 0-2 o'clock, 100 between 2-4 o'clock, 20 between 4-6 o'clock, 30 between 6-8 o'clock, 60 between 8-10 o'clock, 120 between 10-12 o'clock, 130 between 12-14 o'clock, 80 between 14-16 o'clock, 10 between 16-18 o'clock, 110 between 18-20 o'clock, 170 between 20-22 o'clock, and 150 between 22-24 o'clock. Therefore, the difference total is 1120. Hereinafter, the same.

Consequently, a case of sliding the graph A will be simply illustrated in each FIG. 18 (B), FIG. 19 (A), 19 (B), FIG. 20 (A), and 20 (B). However, in reality, as described above, the graph is slid in such a manner that the relative time-period A o'clock is set one by one to each actual time-period.

FIG. 18 (B) is a graph in which the relative time-period A o'clock is set to the actual time period 8-10 o'clock, and the graph A and the graph B are overlapped, and shown. That is, an instance that the graph A is slid by 8 hours from the instance of FIG. 18 (A) is shown. The difference total in this case is 780.

FIG. 19 (A) is a graph in which the relative time-period A o'clock is set to the actual time period-12-14 o'clock, and the graph A and the graph B are overlapped, and shown. The difference total in this case is 320. FIG. 19 (B) is a graph in which the relative time-period A o'clock is set to the actual time period 14-16 o'clock, and the graph A and the graph B are overlapped and shown. The difference total in this case is 280.

FIG. 20 (A) is a graph in which the relative time-period A o'clock is set to the actual time period 16-18 o'clock, and the graph A and the graph B are overlapped and shown. The difference total in this case is 380. FIG. 20 (B) is a graph in which the relative time-period A o'clock is set to the actual time period 22-24 o'clock, and the graph A and the graph B are overlapped and shown. The difference total in this case is 1020.

Thus, the difference total between the graph B while the graph A is calculated, the minimum difference total between graph A and graph B, and an absolute time-period (actual time-period) in which the relative time-period of the detected ultraviolet ray value is set at that time, are stored. That is, in the above example, as shown in FIG. 19 (B), where the relative time-period A o'clock is set to the actual time-period 14-16 o'clock, the difference total is at the minimum, so that a value (280) of the difference total, and the actual time-period to which the relative time-period is set at that time, are calculated corresponding to graph B (ultraviolet ray graph data for a period during which the ultraviolet ray is weak), and stored in the RAM 62.

Similarly, the minimum value of the difference total, and the actual time-period to which the relative time-period is set at that time, when compared with the graphs based on the ultraviolet ray graph data during a period that the ultraviolet ray is strong and the ultraviolet ray is relatively strong, are stored into the RAM 62.

Figure 21:
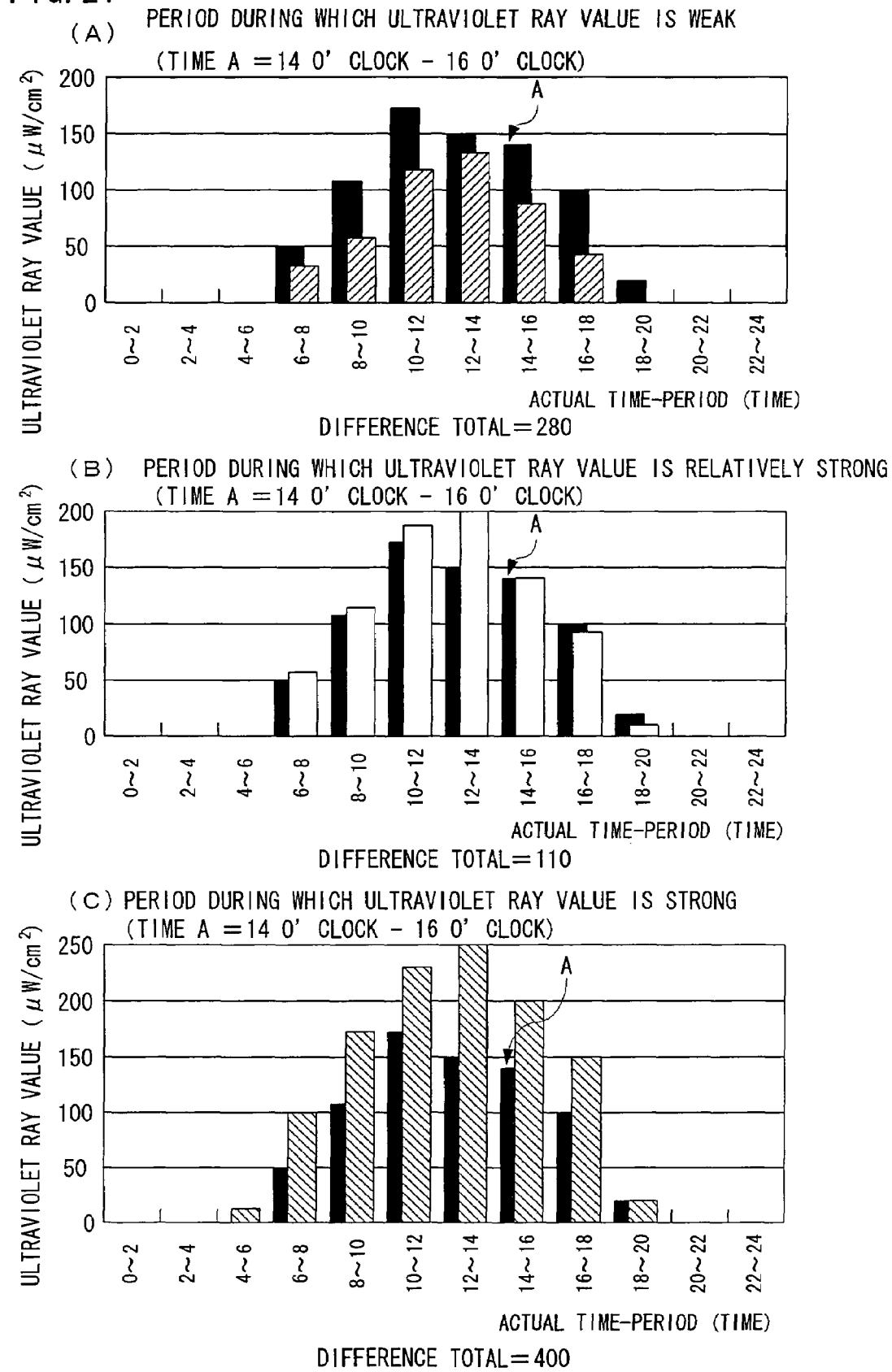
FIG. 21 (A) is a graph shown by superimposing the graph A in a case of setting the relative time-period A o'clock to actual time-periods 14-16 o'clock, and a graph based on the ultraviolet ray graph data in a period that the ultraviolet ray value is weak.

FIGS. 21 (A), (B), and (C) are graphs showing cases where the minimal difference total is calculated by comparing both the graph A shown in FIG. 17 (A) and the graph based on the ultraviolet ray graph data shown in FIG. 17 (B). In each graph, where the relative time-period A o'clock is set to the actual time-period 14-16 o'clock, the difference total is at the minimum. In addition, as understood from FIGS. 21 (A), (B), and (C), it is understood that the graph A in the actual time-period 14-16 o'clock is the most approximate to the graph (FIG. 21 (B)) based on comparison to the ultraviolet ray graph data for a period during which the ultraviolet ray is relatively strong. That is, the detected ultraviolet ray value (graph A) is approximated to the ultraviolet ray graph data having the minimum difference total, out of the values of the difference total obtained as a result of comparison with the ultraviolet ray graph data. Therefore, the correcting data corresponding to the ultraviolet ray graph data may be used. In addition, the relative time-period may be set to the actual time-period stored in the RAM 62 next to the minimum difference total corresponding to the ultraviolet ray graph data.

However, even if the difference total at a minimum, unless the graph based on the detected ultraviolet ray value (maximum value table) is confined to a period between the sunrise and the sunset of the graph based on the ultraviolet ray graph data where the difference total is at a minimum, the ultraviolet ray graph data is not appropriate. That is, if the player moves to a country or a region with a time difference, or when the player takes the game on a trip, for example, the time period between the sunrise and the sunset deviates. In this case, all the ultraviolet ray values recorded in the maximum value table are deleted (rejected), the ultraviolet ray value is once again measured, and the maximum value table is re-created.

Furthermore, the maximum value table shown in FIG. 16 (A) shows a case where maximum ultraviolet ray value is continuously detected from the relative time-period I o'clock to C o'clock. However, if the player suspends or ends the game, for the time period during which the maximum value of the ultraviolet ray value is not measured, the difference is not taken between the ultraviolet ray graph data. This is because if one portion of the ultraviolet ray value is missing, the absolute value of the difference becomes excessively large, consequently it is not possible to determine the appropriate ultraviolet ray graph data, that is, the correcting rate data.

Moreover, in an example shown in FIG. 18-FIG. 21, the relative time-period A o'clock is set to each actual time-period so as to calculate the relative difference totals, and it is understood that when the difference total is at a minimum, then the relative time-period having the maximum detected ultraviolet ray value (of the maximum value table) is set to the actual time-period, in the ultraviolet ray graph data or the actual time-period adjacent thereto, having the maximum ultraviolet ray value.

Therefore, taking this into consideration, in the third ultraviolet ray value correcting process (3) of an illustrative embodiment, in order to reduce an operation process, when comparing the ultraviolet ray value of the maximum value table with the ultraviolet ray value of the ultraviolet ray graph data, the graph based on the maximum value table is moved (shifted) in such a manner that the ultraviolet ray value of the maximum value table is contained between the sunrise and the sunset of the ultraviolet ray graph data to be compared. Additionally, the relative time-period having the maximum ultraviolet ray value is set to the actual time-period of the maximum ultraviolet ray graph data, or the actual time-period adjacent thereto having the maximum ultraviolet ray value.

Figure 22:
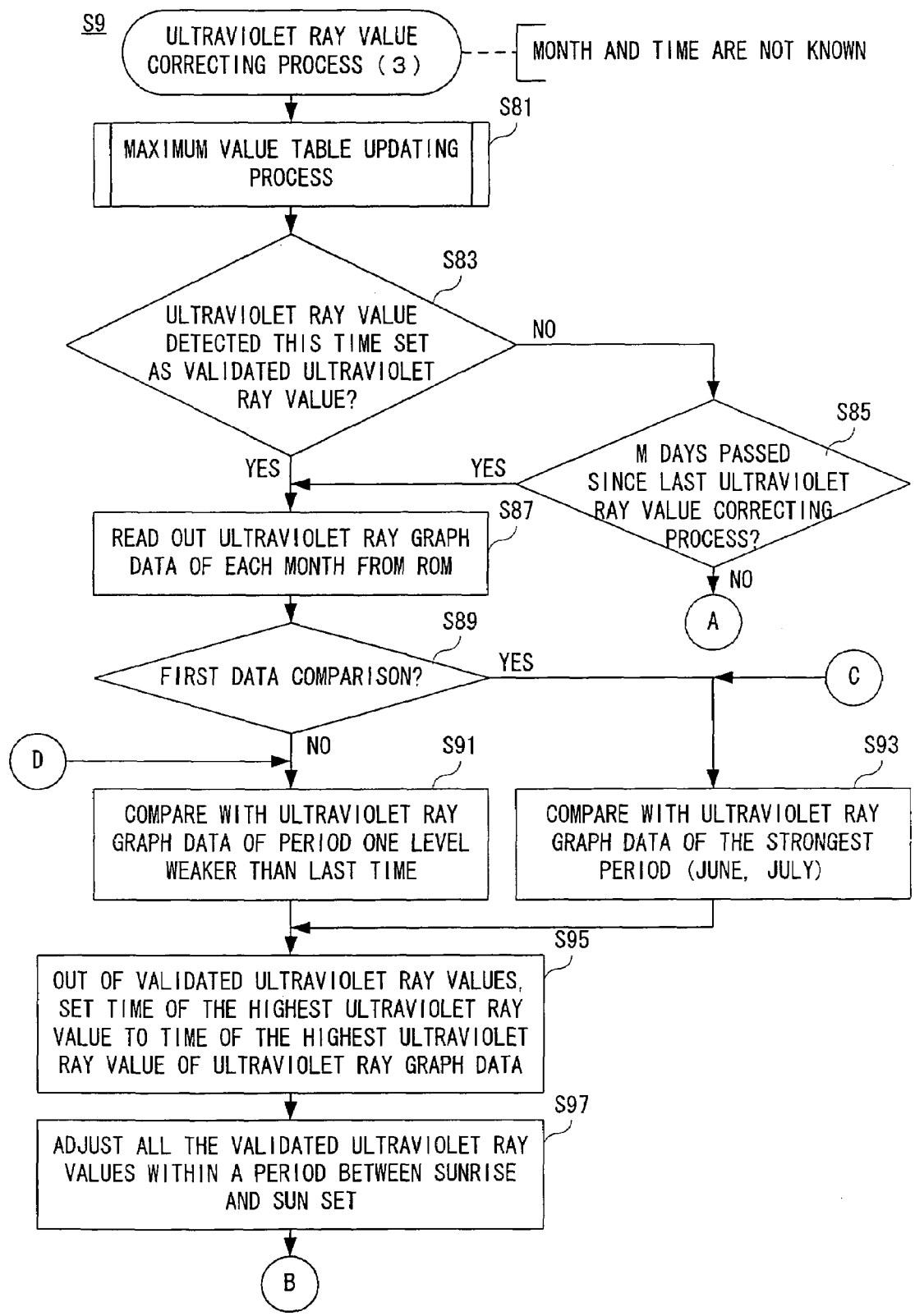
FIG. 22 is a flowchart showing of one portion of the other example of the ultraviolet ray value correcting process of the CPU shown in FIG. 2.
Figure 23:
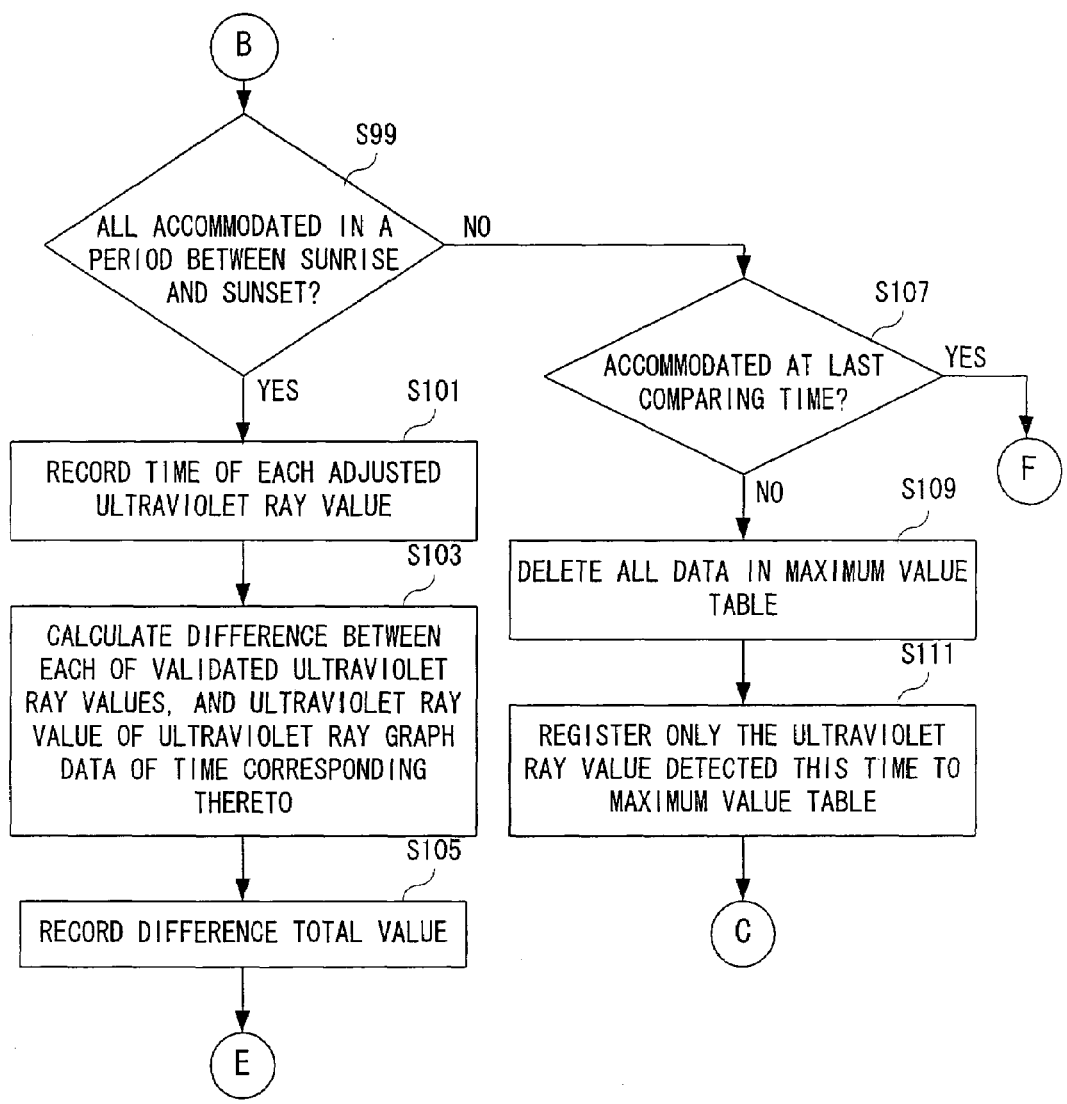
FIG. 23 is a flowchart showing of another portion of the other example of the ultraviolet ray value correcting process of the CPU shown in FIG. 2.
Figure 24:
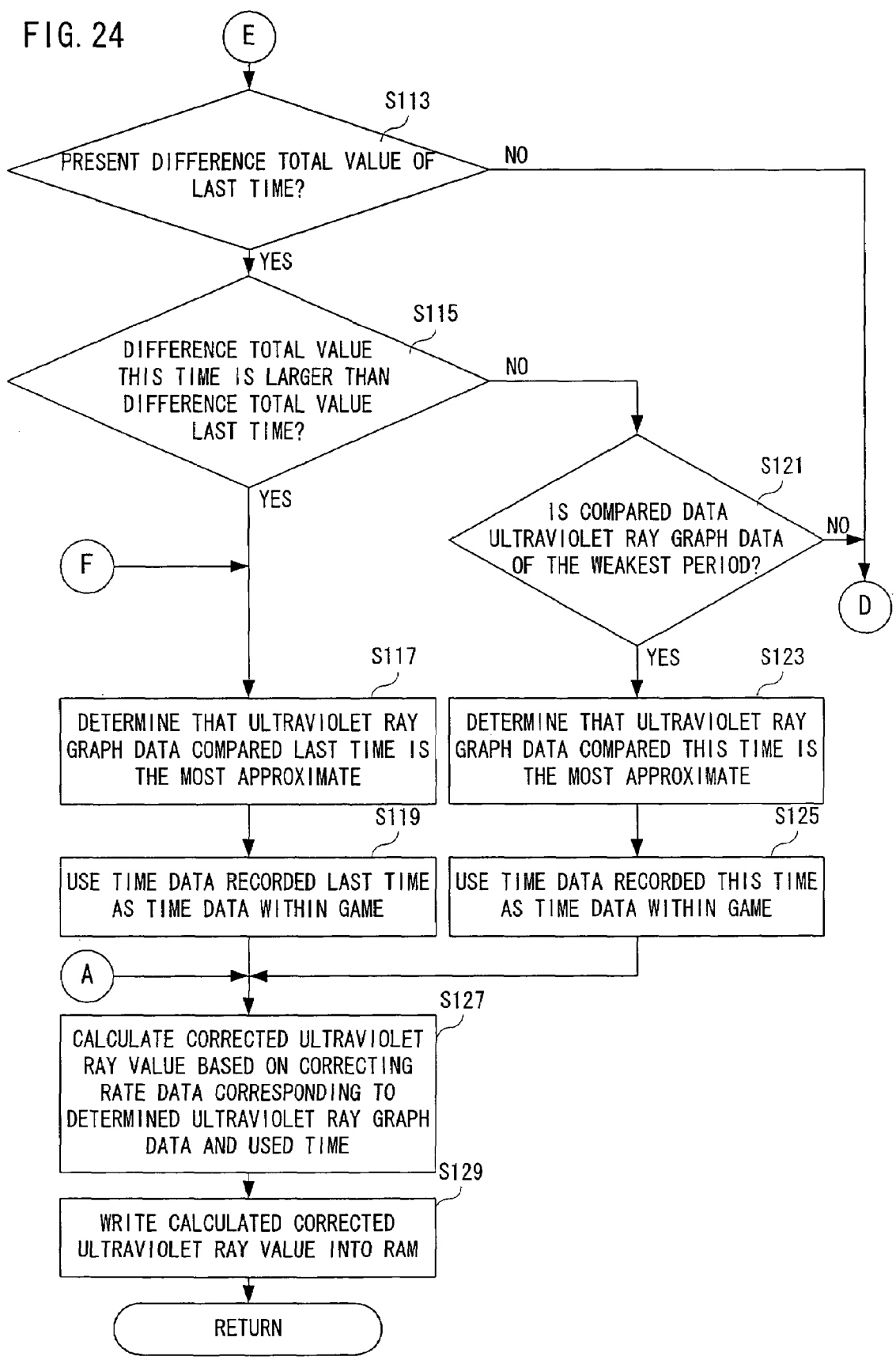
FIG. 24 is a flowchart showing of the other portion of the other example of the ultraviolet ray value correcting process of the CPU shown in FIG. 2.

More specifically, the CPU 40 executes the ultraviolet ray value correcting process (3) according to a flowchart shown in FIG. 22-FIG. 24, and the same process as the ultraviolet ray value correcting process (1) will be simply described.

As shown in FIG. 22, when starting the ultraviolet ray value correcting process (3), the CPU 40 executes a maximum value table updating process described later (see FIG. 25) in a step S81. In a succeeding step S83, it is determined whether or not the ultraviolet ray value detected at this time is set as a valid ultraviolet ray value. That is, it is determined whether or not the ultraviolet ray value detected at this time is the maximum value of the time period in the maximum value table.

If "NO" in the step S83, that is, unless the ultraviolet ray value detected at this time is set as the valid ultraviolet ray value, step S85 determines whether or not M days have passed (9 days, for example) since the last ultraviolet ray value correcting process. If "YES" in step S85, that is, if M days have passed since the last ultraviolet ray value correcting process, the process advances to a step S87. On the other hand, if "NO" in the step S85, that is, unless M days have passed since the last ultraviolet ray value correcting process, the process advances to a step S127 shown in FIG. 24. Furthermore, if "YES" in the step S83, that is, if the ultraviolet ray value detected at this time is set as the valid ultraviolet ray value, the process advances to the step S87.

In the step S87, the ultraviolet ray graph data 606a of each month is read out from the storing area 606 of the ROM 60. Next, in a step S89, it is determined whether or not this is a data comparison for the first time. If "NO" in the step S89, that is, if this is not the first data comparison, in a step S91, the data is compared with the ultraviolet ray graph data 606b in a period weaker by one level than the last time, and the process advances to a step S95.

On the other hand, if "YES" in the step S89, that is, if this is the first data comparison, the data is compared with the ultraviolet ray graph data 606b in the strongest period (in this embodiment, June, and July) in a step S93, and the process advances to the step S95.

In the step S95, the time having the highest ultraviolet ray value, out of the valid ultraviolet ray values (ultraviolet ray value extracted from the maximum value table), is set to the time of the highest ultraviolet ray value of the ultraviolet ray graph data 606b, and in a succeeding step S97, the time of each ultraviolet ray value is adjusted in such a manner that all the valid ultraviolet ray values are contained between the sunrise and the sunset. That is, as a result of the processes of step S95 and the step S97, the relative time-period of the maximum value of the ultraviolet ray value extracted from the maximum value table is set to a location of approximately 12 o'clock of the actual time-period.

Subsequently, in a step S99 shown in FIG. 23, as a result of the adjustment in the step S97, it is determined whether or not all the valid ultraviolet ray values are contained between the sunrise and the sunset. If "YES" in the step S99, that is, if all the valid ultraviolet ray values are contained between the sunrise and the sunset, the process records the time of each adjusted ultraviolet ray value in a step S101. That is, the process writes, into the storing area 632, the time data of the set time, each of which corresponds to ultraviolet ray value data recorded in the storing area 624.

In a succeeding step S103, the absolute values of the difference between each of the valid ultraviolet ray values and the ultraviolet ray value of the ultraviolet ray graph data

606b, for each corresponding time, are calculated, and in a step S105, the process writes into the storing area 630, difference total value data (this-time difference total value data) 630b, and advances to a step S113 shown in FIG. 24.

Furthermore, if "NO" in the step S99, that is, unless all the valid ultraviolet ray values are contained between the sunrise and the sunset, in a step S107, it is determined whether or not all the valid ultraviolet ray values are contained in the last comparison. If "YES" in the step S107, that is, if contained in the last comparison, the process directly advances to a step S117 shown in FIG. 24. On the other hand, if "NO" in the step S107, that is, unless contained in the last comparison, in a step S109 all data in the maximum table stored in the storing area 628 is deleted, and in a step S111 the process registers the ultraviolet ray value detected this time only in the maximum value table, and returns to the step S93 shown in FIG. 22.

As shown in FIG. 24, in a step S113, it is determined whether or not the difference total value data of last time (last-time difference total value data) 630a is stored within the storing area 630. If "NO" in the step S113, that is, unless the last-time difference total value data 630a is stored, the process returns to the step S91 shown in FIG. 22. On the other hand, if "YES" in the step S113, that is, if the last-time difference total value data 630a is stored, it is determined whether or not the this-time difference total value data 630b is greater than the last-time difference total value data 630a in a step S115.

If "YES" in the step S115, that is, if the this-time difference total value data 630b is greater than the last-time difference total value data 630a, it is determined that the ultraviolet ray graph data 606a compared last time in the step S117 is the most approximate. More specifically, in an ultraviolet ray graph data determining flag stored in the storing area 634, a determining flag regarding the ultraviolet ray graph data 606a compared last time is turned on (the data value of the register is rendered "1"). Next, in a step S119, the process uses the time data recorded last time as the time data within the game, and advances to a step S127. More specifically, the CPU 40 deletes (cancels) the time data other than the time data recorded last time, that is, the time data recorded this time, the time data recorded before last time, etc., from the storing area 632.

In addition, if "NO" in the step S115, that is, if the this-time difference total value data 630b is smaller than the last-time difference total value data 630a, in a step S121, the ultraviolet ray graph data 606a (compared data) subject to compare determines whether or not the ultraviolet ray data 606a of the weakest period (in this embodiment, December, and January). If "NO" in the step S121, that is, unless the compared data is the ultraviolet ray graph data 606a of the weakest period, the process directly returns to the step S91.

On the other hand, if "YES" in the step S121, that is, the compared data is the ultraviolet ray graph data 606a of the weakest period, in a step S123, it is determined that the ultraviolet ray graph data 606a compared this time, that is, the compared data, is the most approximate, that is, the determining flag regarding the compared data is written into the storing area 634. In a succeeding step S125, the process uses the time data recorded this time as the time data within the game, and advances to a step S127. That is, in the step S125, the time data other than the time data this time such as the time data last time, the time data before last time, etc., is deleted from the storing area 632.

In the step S127, based on the correcting rate data 606b corresponding to the determined ultraviolet ray graph data, and the used time, that is, the time data stored in the time storing area, the corrected ultraviolet ray value is calculated. That is, the corrected ultraviolet ray value data is calculated according to Equation 2. Furthermore, in the step S129, the process writes the calculated corrected ultraviolet ray value into the storing area 626, and the ultraviolet ray value correcting process (3) returns.

In the ultraviolet ray value correcting process (3), it is possible to appropriately correct the ultraviolet ray value even when the month/date and the time are unknown so that without being affected by a deviation of a clock as a result of the clock function being used, a time difference as a result of a difference in region (longitude), a variance of the ultraviolet ray value as a result of a difference in region (latitude), a yearly variance of the ultraviolet ray value, etc., it is possible to make an accurate correction.

Figure 25:
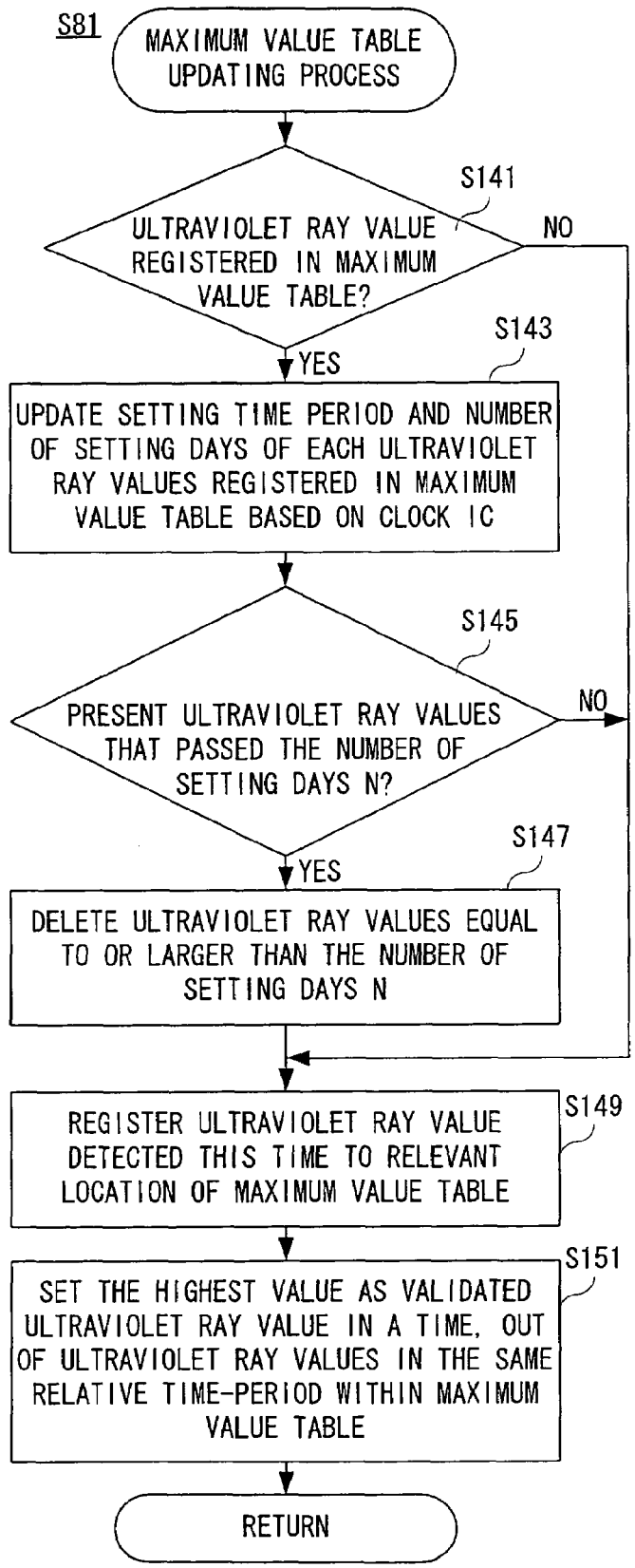
FIG. 25 is a flowchart showing a maximum value table updating process of the CPU shown in FIG. 2.

As shown in FIG. 25, when starting the updating process of the maximum value table of the ultraviolet-ray-value-correcting process (3), the CPU 40 determines whether or not the ultraviolet ray value is registered in the maximum value table stored in the storing area 628 in a step S141. If "NO" in the step S141, that is, unless the ultraviolet ray value is registered in the maximum value table, the process directly advances to a step S149.

On the other hand, if "YES" in the step S141, that is, if the ultraviolet ray value is registered in the maximum value table, based on the time obtained from the clock IC 66, the setting time, and the number of setting days of the each ultraviolet ray value registered in the maximum value table are updated in a step S143.

In a succeeding step S145, it is determined whether or not there is an ultraviolet ray value that passes the number of the setting days N (10 days, for example) or more days. If "NO" in the step S145, that is, unless there is an ultraviolet ray value that passes the number of the setting days N or more days, the process directly advances to a step S149. On the other hand, if "YES" in the step S145, that is, if there is an ultraviolet ray value that passes the number of the setting days N or more days, the ultraviolet ray value that is equal to or more than the number of the setting days N is deleted (erased) from the maximum value table, that is, after rejecting the ultraviolet ray value data of the day of the week that corresponds to today, the process advances to a step S149.

In the step S149 the ultraviolet ray value detected at this time is registered in a relevant location (location according to the setting time and the number of the setting days) of the maximum value table, and in a step S151, out of the ultraviolet ray values in the same relative time-period within the maximum value table, the highest value is set as the valid ultraviolet ray value in that time period (relative time-period), and the updating process of the maximum value table returns.

It is noted that in the above-described ultraviolet ray value correcting processes (1)-(3), it may be possible that each process is set to the game program 602 in advance, and each of them is appropriately used depending on the month/date (period) and the setting situation of the time. In addition, if arranged in such a manner that a setting screen such as a menu screen, etc., is forcedly displayed before starting the game, and the player is guided to set the month and the time, only the ultraviolet ray correcting process (1) may be set to the game program 602. Or, if arranged in such a manner that the setting screen such as the menu screen, etc., is forcedly displayed before starting the game, and the player is guided to set the time, only the ultraviolet ray correcting process (2) may be set to the game program 602.

Next, the usage limiting process (S13) shown in FIG. 7 will be described, and two instances of this process, a case (1) where game use is limited by prohibiting the game process based on the ultraviolet ray value, and a case (2) where game use is limited by forcedly ending the game process, will be separately described.

Figure 26:
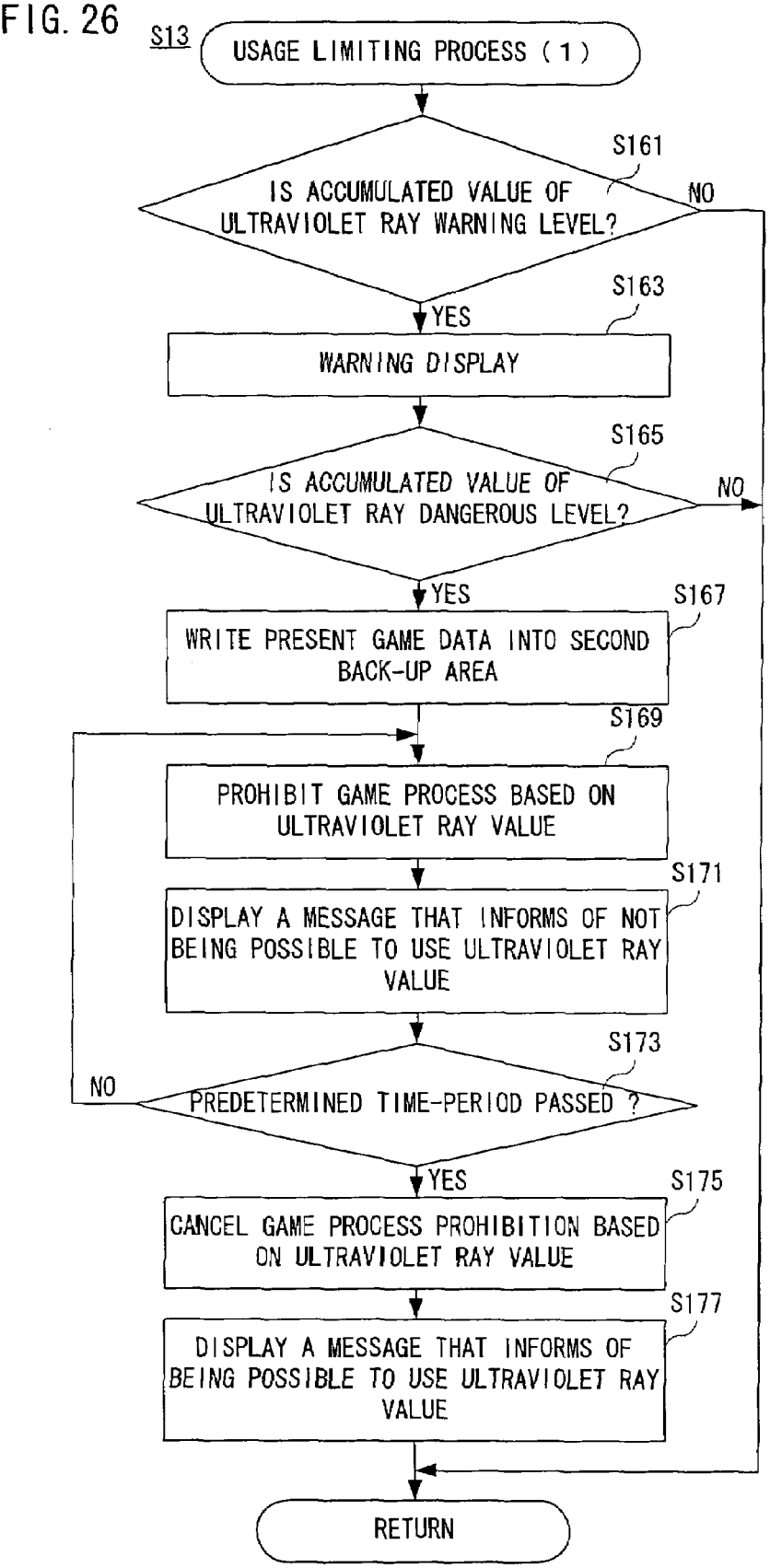
FIG. 26 is a flowchart showing one example of a usage limiting process of the CPU shown in FIG. 2.

As shown in FIG. 26, when starting the usage limiting process (1), the CPU 40 determines whether or not an accumulated value of the ultraviolet ray has reached a warning level in a step S161. More specifically, the CPU 40 detects the accumulated value data 624b stored in the storing area 624, and determines whether or not the accumulated value data 624b exceeds a first predetermined value.

It is noted that the first predetermined value is a value obtained by an experiment, and although omitted in FIG. 3, the value is stored in the ROM 60 in advance.

If "NO" in the step S161, that is, unless the accumulated value of the ultraviolet rays exceed the warning level, the process directly returns the usage limiting process (1). On the other hand, if "YES" in the step S161, that is, if the accumulated value of the ultraviolet rays exceed the warning level, in a step S163, a warning display is performed. The CPU 40 displays a message such as "If you continue the game, dangerous!" on the LCD 14.

In a succeeding step S165, it is determined whether or not the accumulated value of the ultraviolet rays is at a dangerous level. More specifically, the CPU 40 detects the accumulated value data 624b stored in the storing area 624, and determines whether or not the accumulated value data 624b exceeds a second predetermined value larger than the first predetermined value.

It is noted that similar to the first predetermined value, the second predetermined value is a value obtained by the experiment, and although omitted in FIG. 3, the value is stored in the ROM 60 in advance.

If "NO" in the step S165, that is, unless the accumulated value of the ultraviolet rays is at the dangerous level, the process directly returns the usage limiting process (1). On the other hand, if "YES" in the step S165, that is, if the accumulated value of the ultraviolet rays is at the dangerous level, the process writes the present game data into a second backup area 622b in a step S167. More specifically, the CPU 40 stores game data, occurring according to a proceeding of the game, in the work memory 42, and in the step S167, the process writes the latest game data stored in the work memory 42 into the second backup area 622b.

In a succeeding step S169, the game process based on the ultraviolet ray value is prohibited, that is, input from the key matrix 42 is invalidated, the operating signal from the player is rendered unacceptable, and a message that tells the player it is not possible to use the ultraviolet ray value is displayed in a step S171. The CPU 40 displays a message such as "Not possible to play this game for a while" on the LCD 14, in the step S171.

In a succeeding step S173, it is determined whether or not a predetermined time period has elapsed. Although not illustrated, in the step S169, the time of the clock IC 66, when the game process based on the ultraviolet ray is prohibited, is obtained, the difference between the present time is detected, and it is determined whether or not the time period, during which the game process is prohibited, passes a predetermined time period (30 minutes, for example). However, it may be possible that an additional timer is provided, and the time period during which the game process is prohibited is measured. In addition, a determination is made based on an elapsed time-period starting at the time that the game process is prohibited, however, it may be possible that, since an excessive exposure to ultraviolet rays is prevented, after prohibiting the game process, the determination is made based on the elapsed time-period starting at the time that ultraviolet rays are no longer detected.

If "NO" in the step S173, that is, unless the predetermined time period has elapsed, the process returns to the step S169. That is, besides maintaining a prohibiting state of the game process based on the accumulated ultraviolet ray value, a message is continuously displayed that informs the player that it is not possible to use the ultraviolet ray value. On the other hand, if "YES" in the step S173, that is, if the predetermined time period has elapsed, a game process prohibition, based on the ultraviolet ray value, is canceled in a step S175, the process displays a message that tells the player it is possible to use the ultraviolet ray value in a step S177, and thereafter, returns the usage limiting process (1). More specifically, besides validating the input from the key matrix 42, the CPU 40 displays on the LCD 14 a message that tells the player: "Possible to play this game".

It is noted that in the usage limiting process (1) (the same is true of a usage limiting process (2) described later), when determining the warning level or the dangerous level, the actual accumulated value data 624b is used, and this is for a purpose of warning or the game process based on the accumulated value of the ultraviolet ray value actually exposed. This is due to the fact that if the corrected accumulated value data 626b were used, in August, when the ultraviolet rays are strong in reality, even if the actual accumulated value exceeds the warning level or the dangerous level, the warning or the game process would not be prohibited, resulting in excessive exposure to ultraviolet rays. Conversely, in January, when the ultraviolet rays are weak in reality, even if the actual accumulated value does not reach the warning level or the dangerous level, the warning would occur or the game process would be prohibited.

Figure 27:
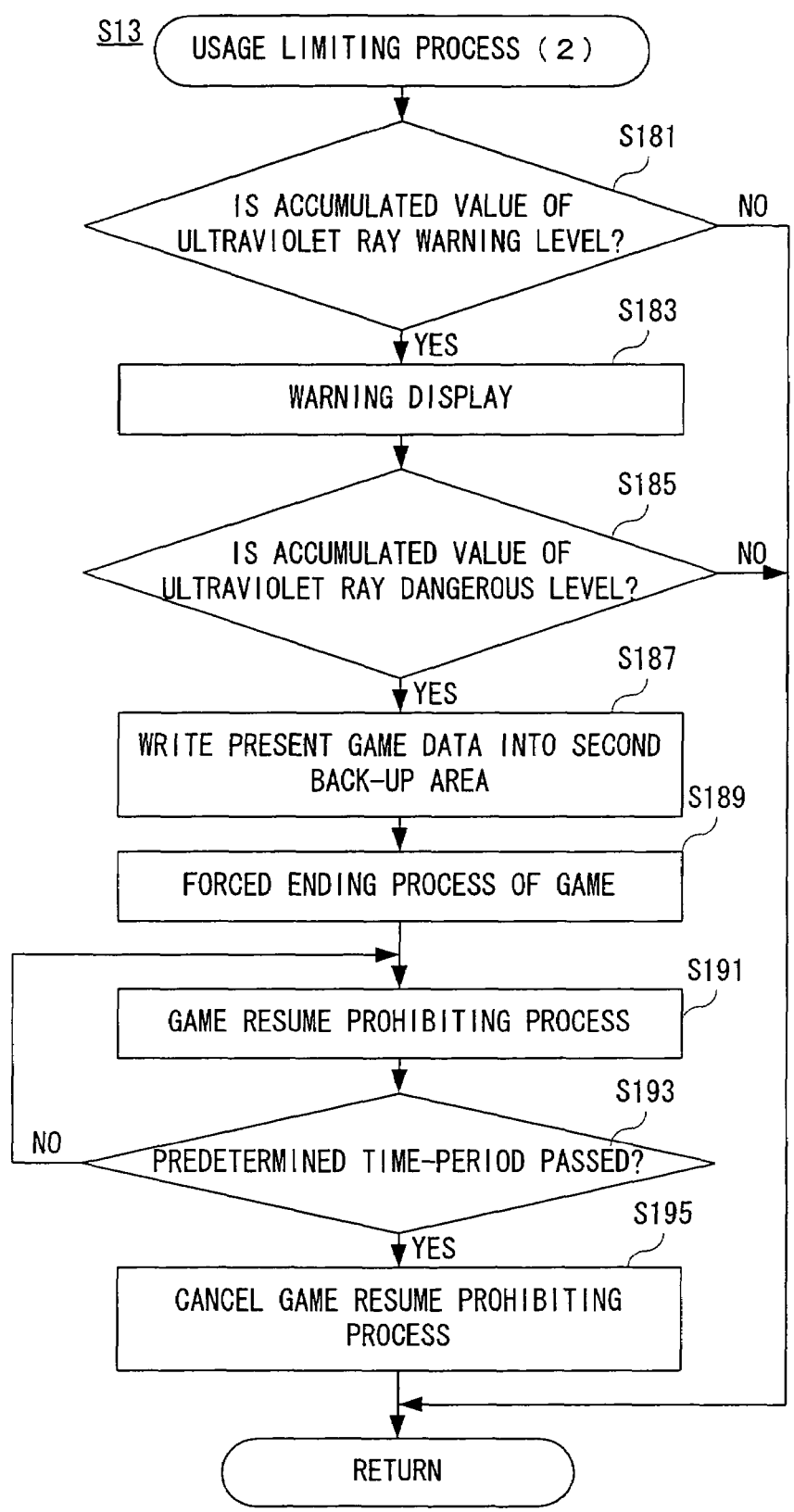
FIG. 27 is a flowchart showing another example of the usage limiting process of the CPU shown in FIG. 2.
Figure 28:
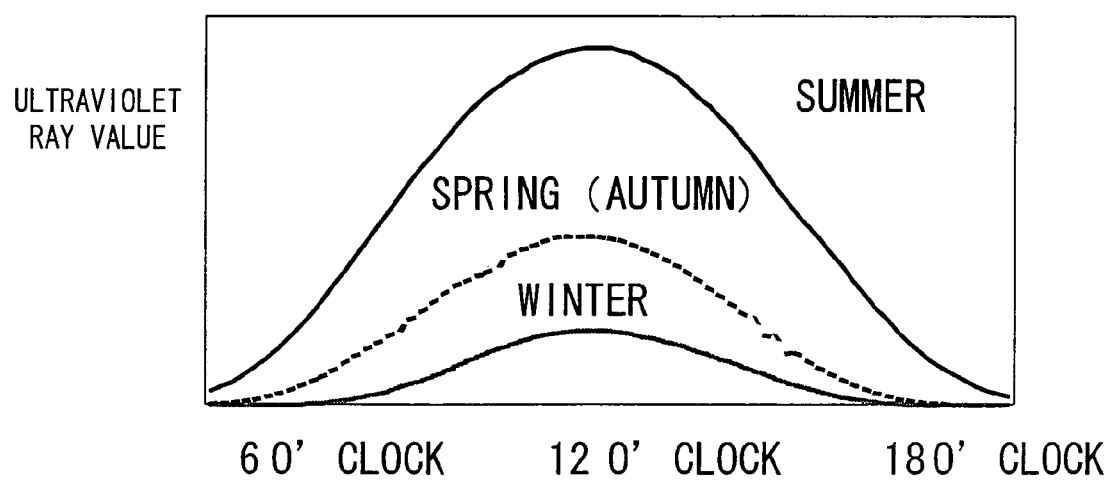
FIG. 28 is a graph showing a change in ultraviolet ray value by each season in an area in which four seasons exist such as Japan.

Next, referring to FIG. 27, a description will be made to the usage limiting process (2), and regarding the same process as the usage limiting process (1), a detailed description will be omitted. As shown in FIG. 27, when starting the usage limiting process (2), the CPU 40 determines whether or not the accumulated value of the ultraviolet rays is at the warning level in a step S181.

If "NO" in the step S181, that is, unless the accumulated value of the ultraviolet rays is at the warning level, the usage limiting process (2) directly returns. On the other hand, if "YES" in the step S181, that is, if the accumulated value of the ultraviolet rays is at the warning level, the warning display is performed in a step S183, and it is determined whether or not the accumulated value of the ultraviolet ray is the dangerous level in a step S185.

If "NO" in the step S185, that is, unless the accumulated value of the ultraviolet rays is at the dangerous level, the process directly returns the usage limiting process (2). On the other hand, if "YES" in the step S185, that is, if the accumulated value of the ultraviolet rays is at the dangerous level, the process writes the present game data, in a step S187, into the second backup area 622b and executes a forced ending process of the game in a step S189. The CPU 40 forcedly displays an initial screen on the LCD 14 in the step S189.

In a succeeding step S191, a game resume prohibiting process is executed. The CPU 40 invalidates input from the key matrix 4', and does not accept the operating signal from the player, for example. In a succeeding step S193, it is determined whether or not the predetermined time period (30 minutes, for example) is elapsed.

It is noted that in such a case, the time of the clock IC 66, at the time of executing the forced ending process of the game, is obtained in the step S189, the difference between the present time and the obtained time is detected, and it is determined whether or not the elapsed time period from when the game has been forcedly ended passes the predetermined time period (30 minutes, for example). However, it may be possible that an additional timer is provided, and the time from when the game has been forcedly ended is measured. In addition, although a determination is made based on the elapsed time-period from a time that the process of the game has been forcedly ended, excessive exposure to ultraviolet rays is prevented, so that after executing the forced ending process of the game, the determination may be made based on the elapsed time-period from a time that the ultraviolet rays are no longer detected.

If "NO" in the step S193, that is, unless the predetermined time period has elapsed, the process directly returns to the step S191. That is, the game resume prohibiting state is maintained. On the other hand, if "YES" in the step S193, that is, the predetermined time period has elapsed, the game resume prohibiting process is cancelled in a step S195, that is, the process validates input from the key matrix 42, and the usage limiting process (2) returns.

It is noted that the descriptions are made regarding the usage limiting process (1), and the usage limiting process (2), and either one of the processes may be stored in the game program 602. This is a determination made by a programmer or a developer.

Furthermore, in the usage limiting process (1), and the usage limiting process (2), the instances describe a first predetermined value and a second predetermined value, which are constant values, however, depending on the period (month, in this embodiment), determined by the setting of the player or the ultraviolet ray value correcting process, the first predetermined value and the second predetermined value may be changeable. This is due to the fact that between summer, in which the ultraviolet rays are strong, and winter, in which the ultraviolet rays are weak, there is a difference in the influence of the rays on a human body.

According to this embodiment, the detected ultraviolet ray value is corrected, and brought closer to the setting value graph so that irrespective of the period or the location in which the game is played, it is possible to consistently apply an enhanced aspect of the game.

In addition, when the game determines that a player has been exposed to a predetermined amount of the ultraviolet rays, the play of the game, which uses the ultraviolet rays, is prohibited, so the player is obliged to interrupt the game, or to select another game, and so forth. Therefore, it is possible to effectively prevent excessive exposure to the ultraviolet rays. In addition, not only the player, but also the game apparatus itself, is not to be excessively exposed to sunlight, so it is possible to prevent damage due to a rise in temperature.

It is noted that in this illustrative embodiment, the ultraviolet ray graph data obtained by previously measuring the ultraviolet ray value of each month in a region in which the four seasons exist such as Japan is stored, one set of ultraviolet ray graph data is specified from the detected ultraviolet ray values, and the correcting rate data corresponding to the specified ultraviolet ray graph data is used. However, the ultraviolet ray value varies depending on the period (month/date) or the location or the region (longitude, latitude), etc., so that if a large number of sets of the ultraviolet ray graph data different depending on the month/date or the region, etc., are further stored, it is possible to more exactly correct the detected ultraviolet ray value. However, in a case of basic correction of the ultraviolet ray value, only the setrs of ultraviolet ray graph data dependant on the four seasons are stored, and the operation process is reduced in length.

Furthermore, in this feature, although the ultraviolet ray sensor is provided in the game cartridge, the ultraviolet ray sensor may alternatively be provided in the game apparatus. In this case, when the game cartridge that records a game program of the game which uses ultraviolet rays is attached, the input from the ultraviolet ray sensor may be validated.

Furthermore, in this illustrative embodiment, only the hand-held game apparatus is described. However, if the ultraviolet ray sensor is provided, it is possible to adapt to a device such as a hand-held computer, a hand-held information terminal, a portable phone, etc., provided with the game function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus that uses an ultraviolet ray to affect a game, comprising:
   a game program storage which stores a game program;
   at least one operating control which inputs operating information from a player;
   ultraviolet ray value detector which detects an ultraviolet ray value;
   correcting-data storage which stores correcting data for correcting the ultraviolet ray value;
   an ultraviolet ray value correcting programmed logic circuitry which corrects the ultraviolet ray value detected by said ultraviolet ray value detector, based on said correcting data; and
   a game process programmed logic circuitry that executes the game, based on the game program stored in said game program storage and the operating information input by said at least one operating control, and uses the ultraviolet ray value, corrected by said ultraviolet ray value correcting programmed logic circuitry, to affect the game.

2. A game apparatus according to claim 1, wherein correcting data includes a correcting value associated with a month/date, and a time; further comprising
   first time-measuring programmed logic circuitry which measures the month/date and the time; wherein
   said ultraviolet ray value correcting programmed logic circuitry corrects the ultraviolet ray value detected by said ultraviolet ray value detector based on the correcting value corresponding to the month/date and the time measured by said first time-measuring programmed logic circuitry.

3. A game apparatus according to claim 1, wherein
   said correcting-data storage further stores two or more sets of graph data, having the ultraviolet ray value and showing a change in time differing depending on a period turned into a graph, further comprising
   determining programmed logic circuitry which determines one set of graph data by comparing the ultraviolet ray value detected by said ultraviolet ray value detector with the ultraviolet ray value of said graph data; wherein
   said ultraviolet ray value correcting programmed logic circuitry corrects the ultraviolet ray value detected by said ultraviolet ray value detector based on the correcting data corresponding to the set of graph data determined by said determining programmed logic circuitry.

4. A game apparatus according to claim 3, further comprising
difference detecting programmed logic circuitry which detects a difference between the ultraviolet ray value detected by said ultraviolet ray value detector and the ultraviolet ray value of said graph data; wherein
said determining programmed logic circuitry determines the set of graph data where the difference detected by said difference detecting programmed logic circuitry is at the minimum.

5. A game apparatus according to claim 4, further comprising
ultraviolet ray value recording programmed logic circuitry which records the ultraviolet ray value detected by said ultraviolet ray value detector according to a relative time-period; and
setting programmed logic circuitry which sets a relative time, at which the highest ultraviolet ray value is detected out of the ultraviolet ray values detected by said ultraviolet ray value detector, to an absolute time at which the highest ultraviolet ray value is detected out of the ultraviolet ray values of said graph data; wherein
said difference detecting programmed logic circuitry detects a difference at a time that said relative time is set to said absolute time by said setting programmed logic circuitry.

6. A game apparatus according to claim 5, wherein
said setting programmed logic circuitry includes adjusting programmed logic circuitry which adjusts the ultraviolet ray values in such a manner that all the ultraviolet ray values detected by said ultraviolet ray value detector are contained between a sunrise and a sunset in said graph data.

7. A game apparatus according to claim 3, further comprising
second time-measuring programmed logic circuitry which measures a time; wherein
said determining programmed logic circuitry compares the ultraviolet ray value detected by the ultraviolet ray value detector with the ultraviolet ray value of said graph data corresponding to the time measured by said second time-measuring programmed logic circuitry so as to determine said one set of graph data.

8. A game apparatus according to claim 1, further comprising
third time-measuring programmed logic circuitry which measures a detected time-period of the ultraviolet ray value detected by said ultraviolet ray value detector;
accumulated-value calculating programmed logic circuitry which calculates an accumulated value of the ultraviolet rays, based on the ultraviolet ray value detected by said ultraviolet ray value detector and the detected time-period measured by said third time-measuring programmed logic circuitry;
accumulated-value determining programmed logic circuitry which determines whether or not the accumulated value calculated by said accumulated-value calculating programmed logic circuitry is equal to or greater than a predetermined value; and
game-process prohibiting programmed logic circuitry which prohibits a game process when determined by said accumulated-value determining programmed logic circuitry that the accumulated value is equal to or greater than the predetermined value.

9. A game apparatus according to claim 1, further comprising
sound controlling programmed logic circuitry which changes a sound in correspondence with the ultraviolet ray value detected by said ultraviolet ray value detector, and a sound output which outputs the sound changed by said sound controlling programmed logic circuitry.

10. A game apparatus according to claim 9, wherein
said sound controlling programmed logic circuitry changes at least one of: a kind, a stress, a pitch, a tempo, and a melody of the sound.

11. A game apparatus that uses ultraviolet rays to affect a game, comprising:
game program storage which stores a game program;
at least one operating control which inputs operating information by a player;
an ultraviolet ray value detector which detects an ultraviolet ray value;
game process programmed logic circuitry which executes the game, based on the game program stored in said game program storage and the operating information input by said at least one operating control, and using the ultraviolet ray value, detected by said ultraviolet ray value detector, to affect the game;
first time-measuring programmed logic circuitry which measures a detected time-period of the ultraviolet ray value detected by said ultraviolet ray value detector;
accumulated-value calculating programmed logic circuitry which calculates an accumulated value of the ultraviolet ray based on the ultraviolet ray value detected by said ultraviolet ray value detector and the detected time-period measured by said first time-measuring programmed logic circuitry;
accumulated-value determining programmed logic circuitry which determines whether or not the accumulated value calculated by said accumulated-value calculating programmed logic circuitry is equal to or greater than a predetermined value; and
game-process prohibiting programmed logic circuitry for prohibiting a game process by said game process programmed logic circuitry when determined by said accumulated-value determining programmed logic circuitry that the accumulated value is equal to or greater than the predetermined value.

12. A game apparatus according to claim 11, further comprising
warning programmed logic circuitry which issues a warning that the game that uses said ultraviolet ray value cannot be played, when determined by said accumulated-value determining programmed logic circuitry that the accumulated value is equal to or greater than the predetermined value.

13. A game apparatus according to claim 11, wherein
said game-process prohibiting programmed logic circuitry prohibits the ultraviolet ray value, detected by said ultraviolet ray value detector, from being used to affect the game.

14. A game apparatus according to claim 11, wherein
said game-process prohibiting programmed logic circuitry forcedly ends the game process by said game process means, further comprising
back-up programmed logic circuitry which backs-up game data immediately before the game process is forcedly ended by said game-process prohibiting programmed logic circuitry.

15. A game apparatus according to claim 11, further comprising second time-measuring programmed logic circuitry which measures an elapsed time-period starting at a time that the game process is prohibited by said game-process prohibiting programmed logic circuitry;

elapsed time-period determining programmed logic circuitry which determines whether or not the elapsed time-period measured by said second time-measuring programmed logic circuitry reaches or exceeds a predetermined time period; and game-process-prohibition canceling programmed logic circuitry which cancels a game process prohibition when said elapsed time-period exceeds the predetermined time period; wherein said game-process prohibiting programmed logic circuitry continues the game process prohibition when said elapsed time-period has not exceeded said predetermined time period.

16. A game apparatus according to claim 14, further comprising game data storage means including at least a first back-up area and a second back-up area; and selecting programmed logic circuitry which selects one of the game data stored in said first back-up area and the game data stored in said second back-up area when starting the game; wherein said back-up programmed logic circuitry writes the game data, at a certain time, when responding to an instruction of a player, into said first back-up area, and writes the game data, at a certain time, immediately before the game process is prohibited by said game-process prohibiting programmed logic circuitry, into said second back-up area.

17. A game apparatus according to claim 11, further comprising sound controlling programmed logic circuitry which changes a sound in correspondence with the ultraviolet ray value detected by said ultraviolet ray value detector, and a sound output which outputs the sound changed by said sound controlling programmed logic circuitry.

18. A game apparatus according to claim 17, wherein said sound controlling programmed logic circuitry changes at least one of: a kind, a stress, a pitch, a tempo, a melody of the sound.

19. A storage medium that stores a game program of a game apparatus provided with at least one operating control which inputs operating information from a player, facilitating a game by generating and displaying a game image on a display corresponding to the operating information, and using ultraviolet rays to affect the game, said game apparatus is further provided with a correcting-data storing programmed logic circuitry which stores correcting data for correcting an ultraviolet ray value, said game program allows a processor of said game apparatus to execute following steps of:

detecting the ultraviolet ray value;

correcting the ultraviolet ray value detected by said detecting step, based on said correcting data; and using the ultraviolet ray value, corrected by said ultraviolet ray value correcting step, to affect the game.

20. A storage medium that stores a game program of a game apparatus provided with at least one operating control which inputs operating information from a player, facilitating a game by generating and displaying a game image on a display corresponding to the operating information, and using ultraviolet rays to affect the game, said game program allows a processor of said game apparatus to execute following steps of:

detecting the ultraviolet ray value;

using the ultraviolet ray value, detected by said detecting step, to affect the game;

measuring a detected time-period of the ultraviolet ray value detected by detecting step;

calculating an accumulated value of the ultraviolet ray based on the ultraviolet ray value detected by said detecting step and the detected time-period measured by said measuring step;

determining whether or not the accumulated value calculated by said calculating step is equal to or greater than a predetermined value; and prohibiting a game process when determined by said determining step that the accumulated value is equal to or greater than the predetermined value.

21. A game method of a game apparatus provided with a game program storage which stores a game program and at least an operating control which inputs operating information from a player, and uses ultraviolet rays to affect a game, said game apparatus is further provided with a correcting-data storage that stores correcting data for correcting an ultraviolet ray value, said game method includes the following steps of:

(a) detecting the ultraviolet ray value, (b) correcting the ultraviolet ray value detected by said step (a) based on said correcting data, and (c) executing the game based on the game program stored in the game program storage and the operating information input by said at least one operating control, and using the ultraviolet ray value, corrected by said step (b), to affect the game.

22. A game method of a game apparatus provided with a game program storage which stores a game program and at least one operating control which inputs operating information from a player, and uses ultraviolet rays to affect a game, comprising following steps of:

(a) detecting an ultraviolet ray value, (b) executing the game based on the game program stored in said game program storage and the operating information input by said at least one operating control, and using the ultraviolet ray value detected by said step (a), to affect the game, (c) measuring a detected time-period of the ultraviolet ray value detected by said step (a), (d) calculating an accumulated value of the ultraviolet rays based on the ultraviolet ray value detected in said step (a) and the detected time-period measured in said step (c), (e) determining whether or not the accumulated value calculated by said step (d) is equal to or greater than a predetermined value, and (f) prohibiting a game process by said step (b) when determined in said step (e) that the accumulated value is equal to or greater than the predetermined value.

23. A method of altering videogame play comprising the steps of:

detecting the intensity of ultraviolet light; and changing an aspect of a videogame based on the detected intensity of ultraviolet light.

24. The method of claim 23, further including adjusting the detected intensity of ultraviolet light based on predetermined correction data.

25. The method of claim 24, further including:

determining the date and time, said adjusting the detected intensity further including adjusting the detected intensity based on predetermined correction data corresponding to the determined date and time.

26. The method of claim 23, further including outputting a sound based on the detected intensity of ultraviolet light.

* * * * *